US012731845B2

(12) United States Patent
Varner et al.

(10) Patent No.: US 12,731,845 B2
(45) Date of Patent: Sep. 8, 2026

(54) BATTERY PACK RECEPTACLE FOR POWER TOOL

(71) Applicant: TECHTRONIC CORDLESS GP, Anderson, SC (US)

(72) Inventors: Evan Varner, Anderson, SC (US); Curt Austin Laugh, Anderson, SC (US); De Yong Mo, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 839 days.

(21) Appl. No.: 17/819,088

(22) Filed: Aug. 11, 2022

(65) Prior Publication Data

US 2024/0055715 A1 Feb. 15, 2024

(51) Int. Cl.

| | |
|---|---|
| ***H01M 50/247*** | (2021.01) |
| ***B25C 1/06*** | (2006.01) |
| ***H01M 50/244*** | (2021.01) |
| ***H01M 50/262*** | (2021.01) |
| ***H01M 50/284*** | (2021.01) |

(52) U.S. Cl.

CPC ............. *H01M 50/247* (2021.01); *B25C 1/06* (2013.01); *H01M 50/244* (2021.01); *H01M 50/262* (2021.01); *H01M 50/284* (2021.01); *H01M 2220/30* (2013.01)

(58) Field of Classification Search

None

See application file for complete search history.

(56) References Cited

U.S. PATENT DOCUMENTS 7,766,097 B2 8/2010 Kondo
7,828,185 B2 11/2010 Hofmann et al.
(Continued)

FOREIGN PATENT DOCUMENTS

CN 1958242 B 7/2012
CN 208773491 U 4/2019
(Continued)

OTHER PUBLICATIONS

Extended European Search Report for Application No. 23188757.1 dated Dec. 15, 2023 (8 pages).

*Primary Examiner* — Brian R Ohara
*Assistant Examiner* — M. T. Leonard
(74) *Attorney, Agent, or Firm* — Michael Best & Friedrich LLP

(57) ABSTRACT

A power tool includes a housing that defines a battery pack attachment portion, which has a first cavity and a flange. A printed circuit board and a motor are positioned within the housing. The motor is electrically communicates with the printed circuit board. A battery pack receptacle is positioned within the first cavity, is movably coupled to the battery pack attachment portion. The battery pack receptacle includes a groove in which the flange of the battery pack attachment portion is received and a second cavity configured to receive at least a portion of a battery pack. One of a spring or a resilient body is positioned between the battery pack attachment portion and the battery pack receptacle and is configured to bias the battery pack attachment relative to the battery pack receptacle. Power tool terminals are supported by the battery pack receptacle and electrically communicate with the printed circuit board.

16 Claims, 26 Drawing Sheets

(56) References Cited

U.S. PATENT DOCUMENTS

| | | | | |
|---|---|---|---|---|
| 8,123,098 | B2 | 2/2012 | Miyata | |
| 10,040,178 | B2 | 8/2018 | Kondo et al. | |
| 10,232,479 | B2 | 3/2019 | Thorson et al. | |
| 10,780,564 | B2 | 9/2020 | Iida et al. | |
| 11,073,203 | B2 | 7/2021 | Nakashima | |
| 11,117,234 | B2 | 9/2021 | Thorson et al. | |
| 2005/0082920 | A1 | 4/2005 | Heigl et al. | |
| 2008/0302552 | A1* | 12/2008 | Kondo | B25F 5/006 173/217 |
| 2015/0151423 | A1* | 6/2015 | Burger | B25F 5/02 310/50 |
| 2018/0054032 | A1 | 2/2018 | Peloquin et al. | |
| 2019/0001477 | A1 | 1/2019 | Ullrich et al. | |
| 2020/0215678 | A1 | 7/2020 | Nakashima | |
| 2021/0016428 | A1 | 1/2021 | Nakashima | |
| 2021/0039242 | A1 | 2/2021 | Ogura | |
| 2021/0162575 | A1 | 6/2021 | Kneer et al. | |
| 2021/0237249 | A1 | 8/2021 | Fischer et al. | |
| 2021/0283758 | A1 | 9/2021 | Furusawa et al. | |
| 2021/0379717 | A1 | 12/2021 | Thorson et al. | |
| 2022/0328924 | A1* | 10/2022 | Garibaldi | B25F 5/02 |

FOREIGN PATENT DOCUMENTS

| | | | |
|---|---|---|---|
| CN | 213673951 | U | 7/2021 |
| CN | 113210669 | A | 8/2021 |
| CN | 215395059 | U | 1/2022 |
| DE | 19933015 | A1 | 5/2000 |
| DE | 102013201504 | A1 | 7/2014 |
| DE | 112014006502 | T5 | 12/2016 |
| DE | 202017105258 | U1 | 9/2017 |
| EP | 3822028 | A1 | 5/2021 |
| JP | 2005169533 | A | 6/2005 |
| JP | 2015074062 | A | 4/2015 |
| JP | 2018075703 | A | 5/2018 |
| WO | 2018137127 | A1 | 8/2018 |

* cited by examiner 248c
248, 248a
252
249d
118

300
248c
248, 248b
252
248d
248d 278
244
278
274
240
270
270
240

404
270
150
208
424
416
404
270
424

14
17
17
130
150
18c
228

454
450
458
462
200

208
458
450
462
204
454
150

270
170, 170b
552
220
540

270
556
18d
22
350

BATTERY PACK RECEPTACLE FOR POWER TOOL

FIELD OF THE DISCLOSURE

The present disclosure relates to a battery pack receptacle for a power tool.

BACKGROUND OF THE DISCLOSURE

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.). Fastener drivers, like many other types of power tools, undergo significant vibration and hard impacts during use.

SUMMARY OF THE DISCLOSURE

The present disclosure provides, in one aspect, a power tool including a housing that defines a battery pack attachment portion. The battery pack attachment portion includes a first cavity and a flange. A printed circuit board is positioned in the housing. A motor is positioned within the housing and in electrical communication with the printed circuit board. A battery pack receptacle positioned within the first cavity and movably coupled to the battery pack attachment portion. The battery pack receptacle includes a groove in which the flange of the battery pack attachment portion is received and a second cavity configured to receive at least a portion of a battery pack. One of a spring or a resilient body is positioned between the battery pack attachment portion and the battery pack receptacle and is configured to bias the battery pack attachment relative to the battery pack receptacle. Power tool terminals are supported by the battery pack receptacle and in electrical communication with the printed circuit board.

In another aspect the disclosure provides a power tool comprising a housing having a handle portion and a battery pack attachment portion coupled thereto. The battery pack attachment portion includes a first cavity. A printed circuit board is positioned in the housing. A motor is positioned within the housing and in electrical communication with the printed circuit board. A battery pack receptacle is positioned within the first cavity and movably coupled to the battery pack attachment portion, the battery pack receptacle including a second cavity configured to receive at least a portion of a battery pack. One of a spring or a resilient body is positioned between the battery pack attachment portion and the battery pack receptacle and is configured to bias the battery pack attachment relative to the battery pack receptacle. Power tool terminals are supported by the battery pack receptacle and in electrical communication with the printed circuit board. The battery pack receptacle is movable from a first position in which the one of the spring or the resilient body is in a first compressed state and a second position, closer to the battery pack attachment portion of the housing, in which the one of the spring or the resilient body is in a second compressed state. The one of the spring or the resilient body is further compressed in the second position than the first position.

In another aspect, a power tool includes a housing that defines a battery pack attachment portion. The battery pack attachment portion includes a first cavity. A printed circuit board is positioned in the housing. A motor is positioned within the housing and in electrical communication with the printed circuit board. A battery pack receptacle is positioned within the first cavity and movably coupled to the battery pack attachment portion. The battery pack receptacle includes a second cavity configured to receive at least a portion of a battery pack. One of a spring or a resilient body is positioned between the battery pack attachment portion and the battery pack receptacle and is configured to bias the battery pack attachment relative to the battery pack receptacle. The one of the spring or the resilient body is positioned in a free state in an initial position. Power tool terminals are supported by the battery pack receptacle and in electrical communication with the printed circuit board.

Other features and aspects of the disclosure will become apparent by consideration of the following detailed description and accompanying drawings.

Figure 1A:
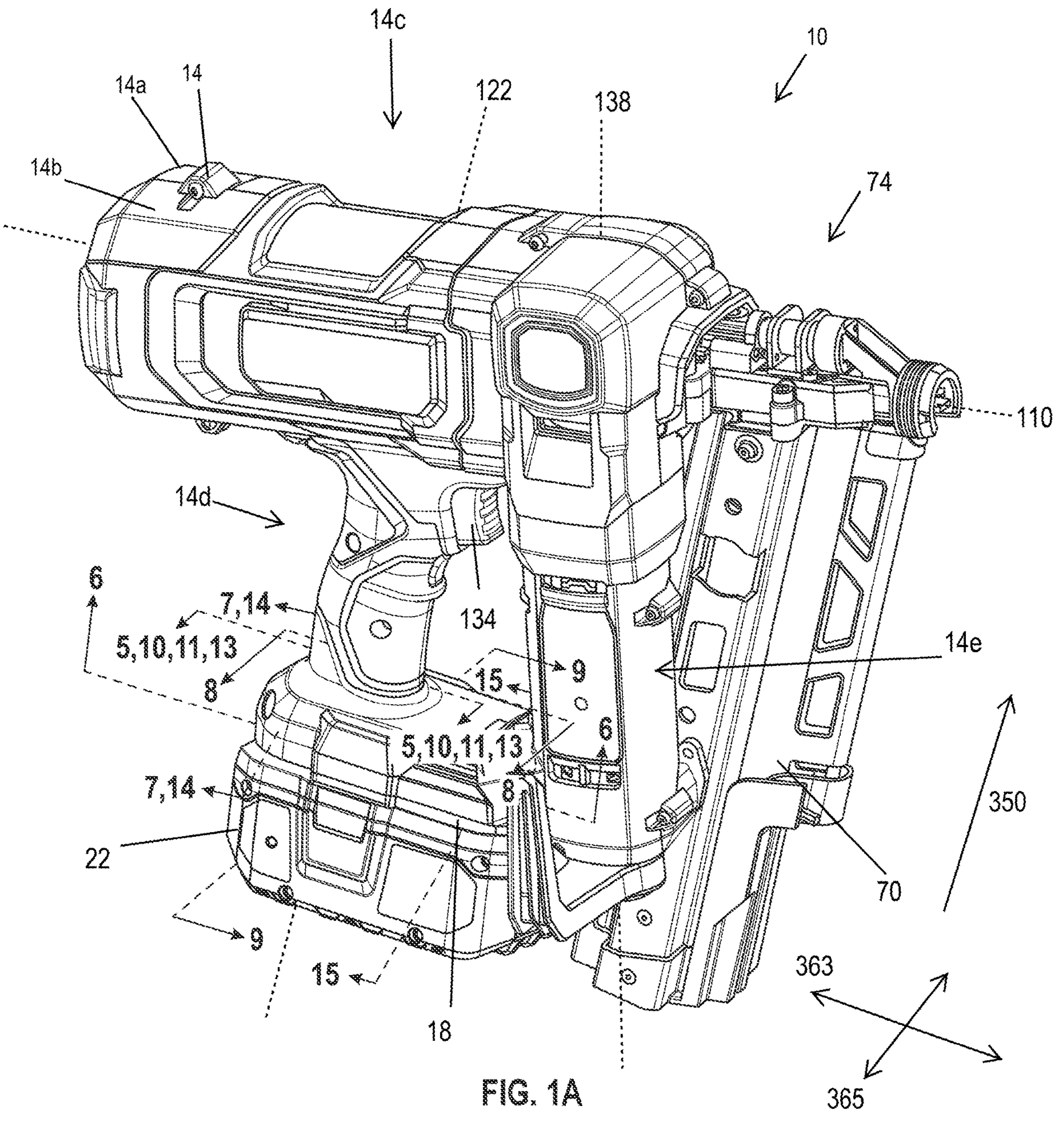
FIG. 1A is a perspective view of a power tool, such as a powered fastener driver, including a housing, a battery pack receptacle according to one embodiment, and a battery pack coupled to the battery pack receptacle.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a power tool 10 including a housing 14 and a battery pack receptacle 18 coupled to the housing 14. A battery pack 22 is coupled to the battery pack receptacle 18 for powering the power tool 10.

In the embodiment of FIG. 1, the battery pack 22 is a stem-style or tower-style battery pack 22, as shown in at FIGS. 2A, 3, 4A, and 9. Therefore, the battery pack 22 includes a housing 26 (FIG. 4A) that houses a plurality of battery cells (not shown) and battery pack electronics (not shown), a stem 38 (FIG. 4A) that extends from the housing 26, and a pair of latch mechanisms 42 (FIG. 9) that are positioned on opposite sides of the housing 26. Each of the latch mechanisms 42 includes a latch 52 coupled to a latch actuator 56. The latches 52 each include a projection 54 facing outwardly relative to the housing 26. Each of the latches 52 is movable between a locked position and an unlocked position by depressing the latch actuator 56 inwardly against the bias of a spring or other such biasing structure (not shown). In the illustrated embodiment, the stem 38 has a pair of battery pack terminals **44*a* coupled thereto. Also, the battery pack 22 may include an auxiliary pair of battery pack terminals 44*b* (FIG. 4A) in a top surface 26*a* of the housing 26. As discussed relative to FIGS. 19-24, the battery pack 22 may have other configurations, such as a slide-on battery pack 22**.

In the illustrated embodiments, the power tool 10 is a gas spring-powered fastener driver that is operable to drive fasteners (e.g., nails, tacks, staples, etc.) held within a magazine 70 into a workpiece. Therefore, a nosepiece assembly 74 is coupled the housing 14 and to the magazine 70. The nosepiece assembly 74 cooperatively defines a firing channel (not shown) extending along the driving axis 110. The firing channel is in communication with the fastener channel (not shown) of the magazine 70 for receiving a fastener from the magazine 70. As shown schematically in FIGS. 1B and 1C, the power tool 10 includes an inner cylinder 82 and a moveable piston 86 positioned within the inner cylinder 82. Also, a driver blade 90 is attached to the piston 86 and moveable therewith. A bumper 94 is positioned at one end of the inner cylinder 82 and is configured to absorb vibration and impact upon contact with the piston 86. The power tool 10 does not require an external source of air pressure, but rather includes an outer storage chamber cylinder 98 of pressurized gas in fluid communication with the inner cylinder 82. In the illustrated embodiment, the inner cylinder 82 and moveable piston 86 are positioned within the outer storage chamber cylinder 98. The inner cylinder 82 and the driver blade 90 define the driving axis 110.

Figures 1B, 1C:
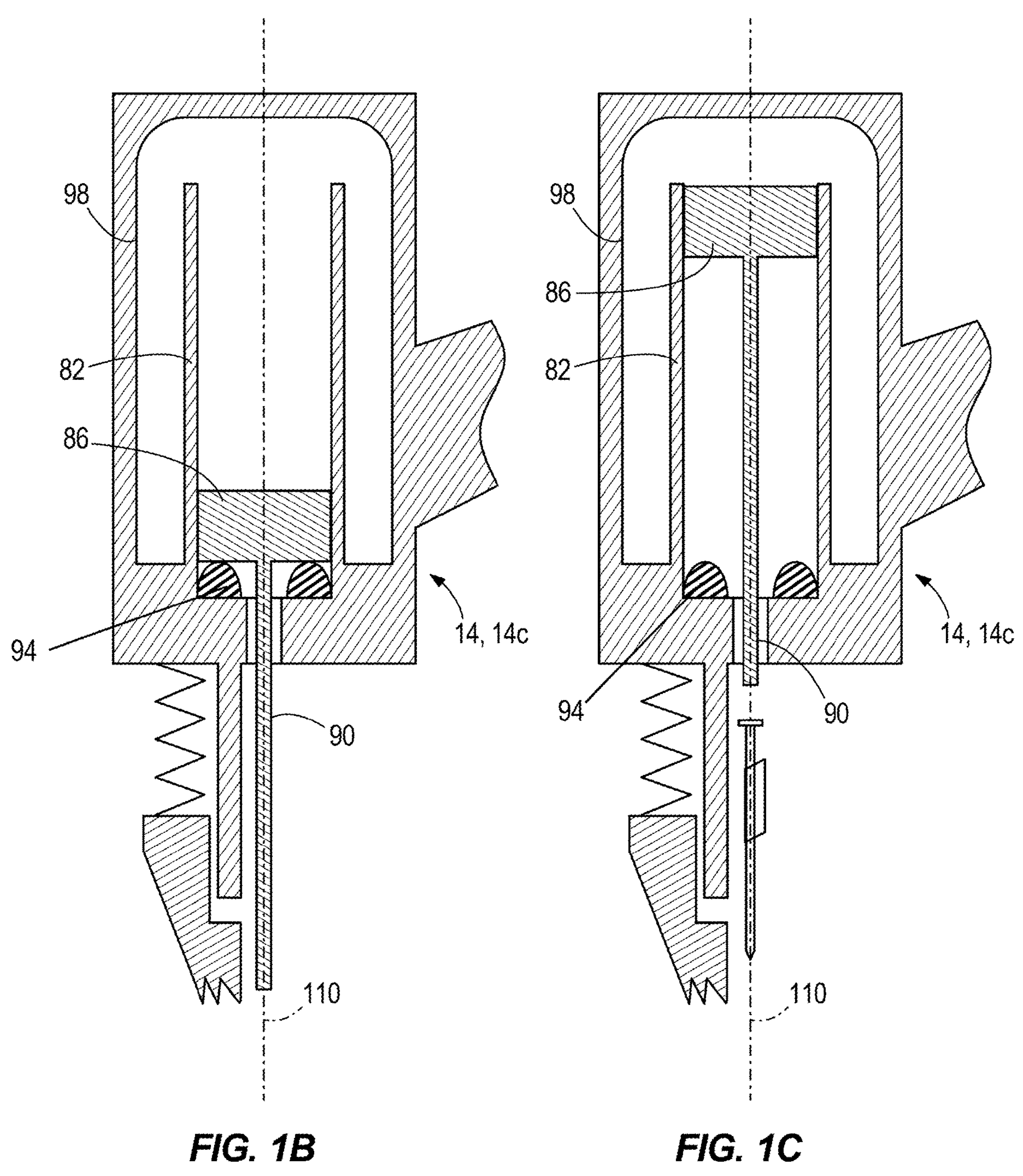
FIG. 1B is a schematic view of a piston and a driver blade of the power tool of FIG. 1 in a driven or bottom dead center position.
FIG. 1C is a schematic view of a piston and a driver blade of the power tool of FIG. 1 in a top dead center position prior to actuation.
Figure 2A:
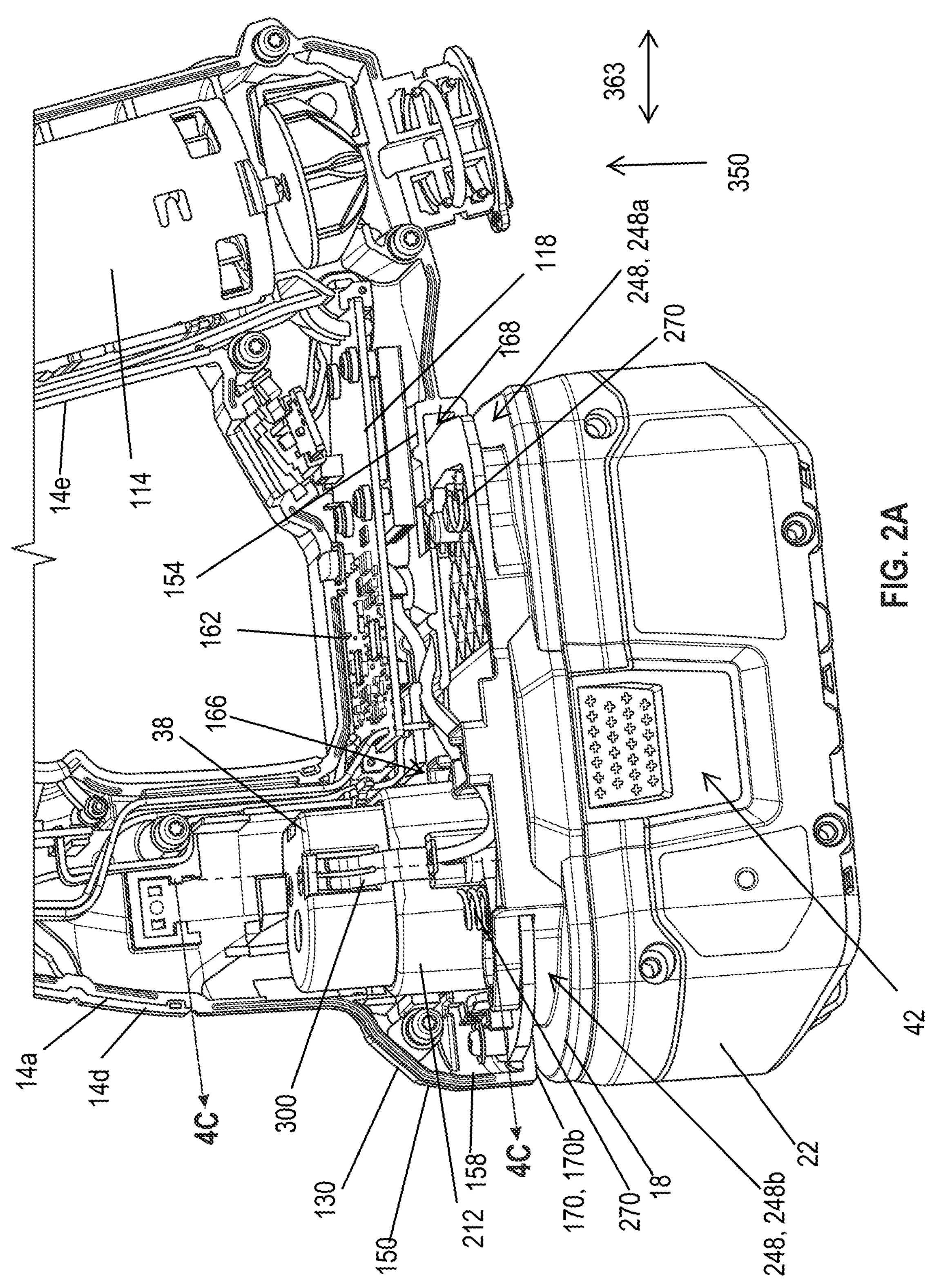
FIG. 2A is a perspective view of the power tool of FIG. 1A with a portion of the housing removed.

During a driving cycle, the driver blade 90 and piston 86 are moveable between a top-dead-center (TDC) position (FIG. 1C) and a driven or bottom-dead-center (BDC) position (FIG. 1B). The power tool 10 further includes a lifting assembly (not shown), which has a lifter that is powered by a motor 114 (e.g., FIG. 2A) and that moves the driver blade 90 from the BDC position to the TDC position. In particular, the motor 114 provides torque to a transmission, the output of which is operably coupled to the lifter. The driver blade 90 is received in the firing channel for driving the fastener from the firing channel 78, out the distal end of the nosepiece assembly 74, and into a workpiece, as discussed above. In other embodiments, and as persons having skill in the art will understand, the power tool 10 may be any other type of battery powered power tool 10 (e.g., a drill, a rotary hammer, an impact driver, an oscillating tool, and/or the like) having suitable configurations. The motor 114 is in electrical communication with one or more printed circuit boards 118 (only one of which is shown in FIG. 2A). In the illustrated embodiment, the one or more printed circuit board 118 may be positioned within and supported by the housing 14.

As shown in FIG. 1A, the housing 14 includes a first housing shell or piece **14*a* and a second housing shell or piece 14*b* coupled to one another (via fasteners or the like). In other embodiments, the housing 14 may be formed as a single integral piece or may be constructed of more than two pieces. In the illustrated embodiment, the housing 14 (e.g., the first and second housing pieces 14*a*, 14*b*) define a first portion 14*c*, a second portion 14*d*, and a third portion 14*e*. The first portion 14*c* supports the inner cylinder 82 and the outer storage chamber cylinder 98 and is oriented along the driving axis 110. The second portion 14*d* defines a handle that is oriented along an axis 122 that intersects the driving axis 110. The second portion 14*d* also defines a battery pack attachment portion 130 (FIG. 2A) that is configured to movably couple the battery pack receptacle 18, as discussed in greater detail below. A trigger switch 134 is supported by the second portion 14*d* and is in electrical communication with the motor 114 and the printed circuit board 118. In the illustrated embodiment, the third portion 14*e* supports the motor 114, the transmission, and the lifter. In the illustrated embodiment, the third portion 14*e* extends along an axis 138. The magazine 70 is supported in part by the third portion 14*e*. The first portion 14*c* is positioned generally between the second portion 14*d* and the third portion 14*e*. Additionally, the battery pack attachment portion 130 is coupled to the third portion 14*e*. In other embodiments, the third portion 14*e* may be omitted. In such an embodiment, the motor 114 and transmission may be supported by either or both of the first portion 14*c* and the second portion 14*d*. Regardless, the printed circuit board 118 may be positioned within the battery pack attachment portion 130, as shown in FIG. 2A, or within the handle. In other embodiments, the power tool 10 may include multiple printed circuit boards 118, and therefore one of the printed circuit boards may be positioned within the battery pack attachment portion 130** and another printed circuit board may be positioned within the handle.

With specific reference to FIGS. 2A, 3, 6, and 8, in some embodiments, the battery pack attachment portion 130 has an outer wall 150 that is integrally formed with the second portion 14*d* of the housing 14. In the illustrated embodiment, the outer wall 150 is also integrally formed with the third portion 14*e*. The battery pack attachment portion 130 further includes an inner wall 154 that is integrally formed with and extends from an inner side surface 158 of the outer wall 150. The inner wall 154 is spaced apart from an inner top surface 162 of the outer wall 150. An opening 166 may extend through the inner wall 154. The opening 166 may be in communication with an interior of the second portion 14*d* of the housing 14. The printed circuit board 118 may be positioned between the inner top surface 162 of the outer wall 150 and the inner wall 154. A housing cavity 168 may be defined between the inner wall 154 and a distal end of the outer wall 150. In the illustrated embodiment, the distal end of the outer wall 150 has a generally ovular shape, although other suitable shapes in other embodiments are contemplated. A flange or lip 170 may extend inward from the inner side surface 158 at the distal end of the outer wall 150. The flange 170 may be spaced apart from the inner wall 154 and at least partially define the housing cavity 168. In the illustrated embodiment, the flange 170 includes a first flange portion 170*a* that extends from and about a front end of the outer wall 150 and a second flange portion 170*b* that extends from and about a rear end of the outer wall 150. Therefore, the flange 170 only extends about only a portion of a perimeter of the distal end of the outer wall 150. In other embodiments, the flange 170 may extend about the entire perimeter or have other suitable configurations.

With respect to FIGS. 2A-4A, the battery pack receptacle 18 may be movably coupled to the battery pack attachment portion 130. That is, as discussed in greater detail below, the battery pack receptacle 18 can translate, oscillate, and/or slide along one or more axes. As shown, the battery pack receptacle 18 includes a body 200 (FIG. 4A) that is sized and shaped to be received by the battery pack attachment portion 130. In the illustrated embodiment, the battery pack receptacle 18 is configured to receive and couple to the stem 38 of the battery pack 22. As will be discussed below, in some embodiments, the battery pack receptacle 18 may be configured to receive and secure a slide-on battery pack 22.

With continued reference to FIGS. 2A-4B, the body 200 of the battery pack receptacle 18 defines a generally ovular outer perimeter, for example, that corresponds to the perimeter of the battery pack attachment portion 130. The body 200 includes a top surface 204 and a bottom surface 208 opposite the top surface 204. A projection 212 extends from the top surface 204. The projection 212 is hollow and in communication with an opening 216 (FIG. 5) that extends through the body 200. As shown, the projection 212 is positioned adjacent a rear end of the battery pack receptacle 18. The top surface 204 includes a plurality of bosses 220—e.g., two at the rear end and two at a front end (FIG. 4A). A battery pack receptacle cavity or recess 228 (FIG. 5) is defined in the bottom surface 208. The opening 216 also communicates with the battery pack receptacle cavity 228. The opening 216, the hollow portion of the projection 212, and the battery pack receptacle cavity 228 are configured to receive the battery pack 22.

Figure 4A:
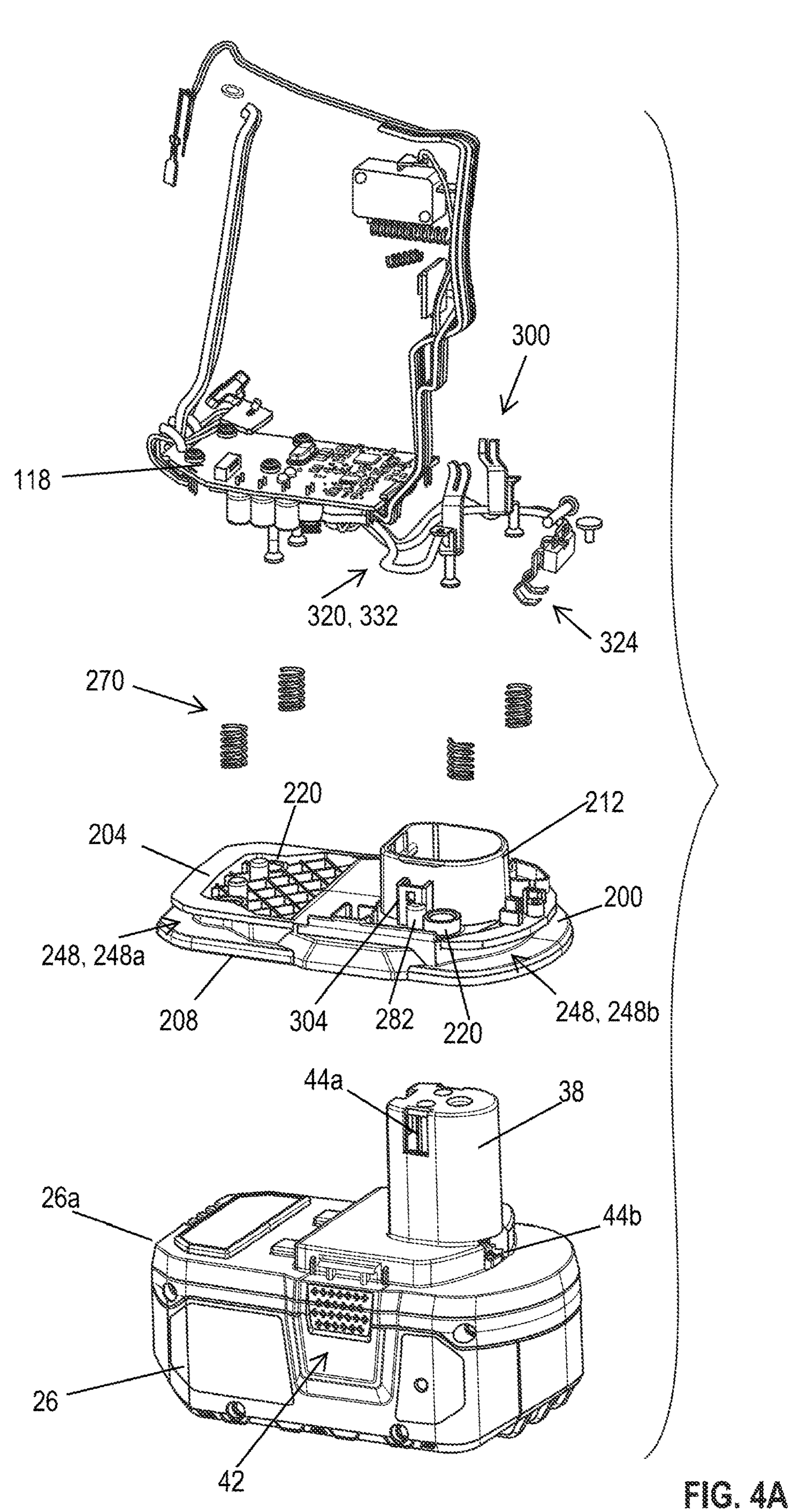
FIG. 4A is an exploded view of the power tool of FIG. 1A.
Figure 5:
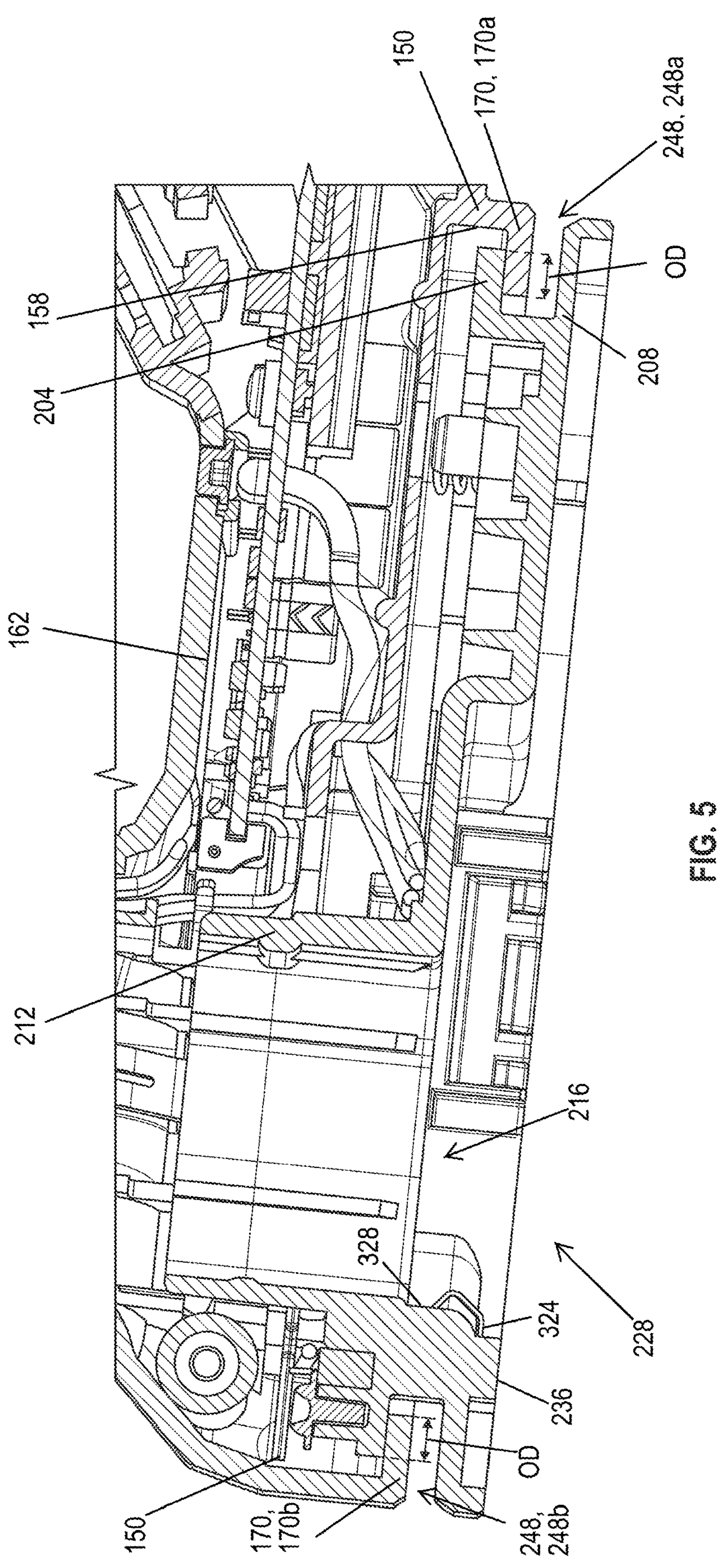
FIG. 5 is a cross-sectional view of the power tool of FIG. 1A along the line 5-5 of FIG. 1A.
Figure 6:
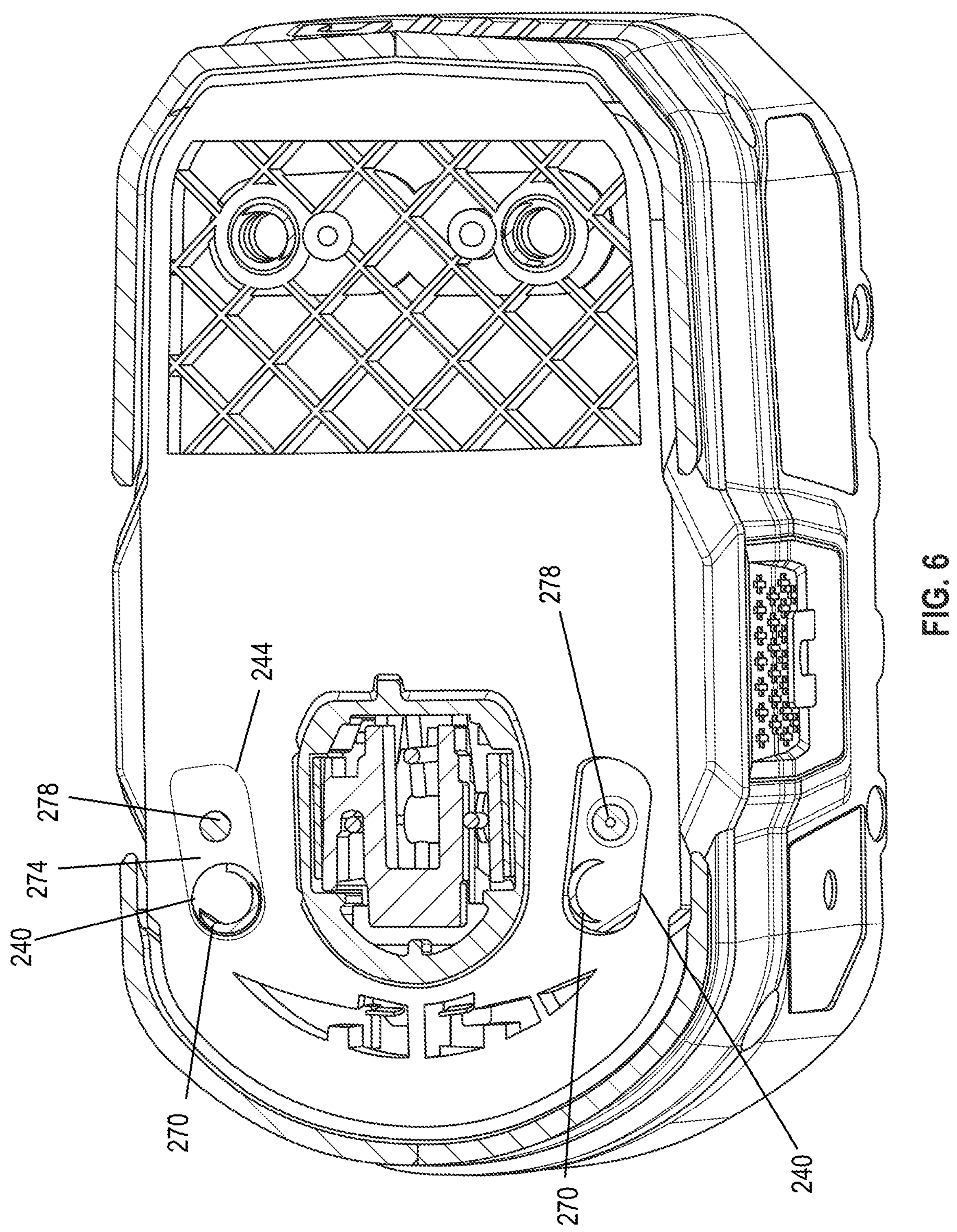
FIG. 6 is a cross-sectional view of the power tool of FIG. 1A along the line 6-6 of FIG. 1A.
Figure 7:
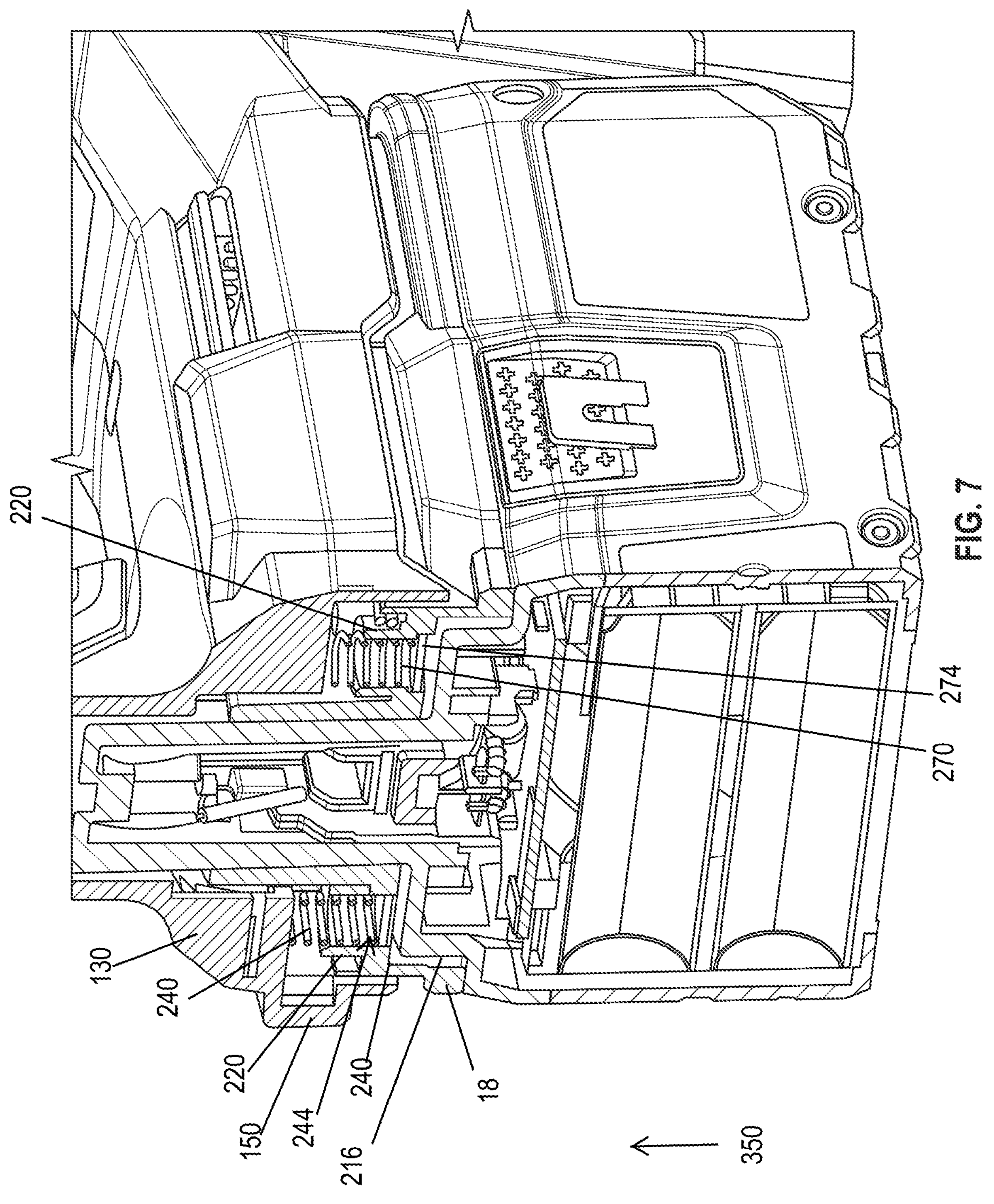
FIG. 7 is a cross-sectional view of the power tool of FIG. 1A along the line 7-7 of FIG. 1A.

A pair of projections 232 (FIG. 9) extend from opposite sides of an inner surface 236 of the battery pack receptacle cavity 228. A plurality of recesses 240 (FIG. 8) are formed in the inner surface 236 of the battery pack receptacle cavity 228 and each at least partially overlaps a corresponding boss 220. A plurality of apertures 244 extend through the body 200. Each of the apertures 244 is in communication between a corresponding boss 220 and recess 240. A groove 248 is defined between the top surface 204 and the bottom surface 208. In the illustrated embodiment, the groove 248 includes a first groove portion 248*a* that extends about a front end of the body 200 and a second groove portion 248*b* that extends about a rear end of the body 200 (FIG. 4A). Therefore, the groove 248 only extends about a portion of the outer perimeter of the body 200. In other embodiments, the groove 248 may extend about the entire perimeter or have other suitable configurations. The projections 232 are positioned between the first groove portion 248*a* and the second groove portion 248*b*.

Figure 2B:
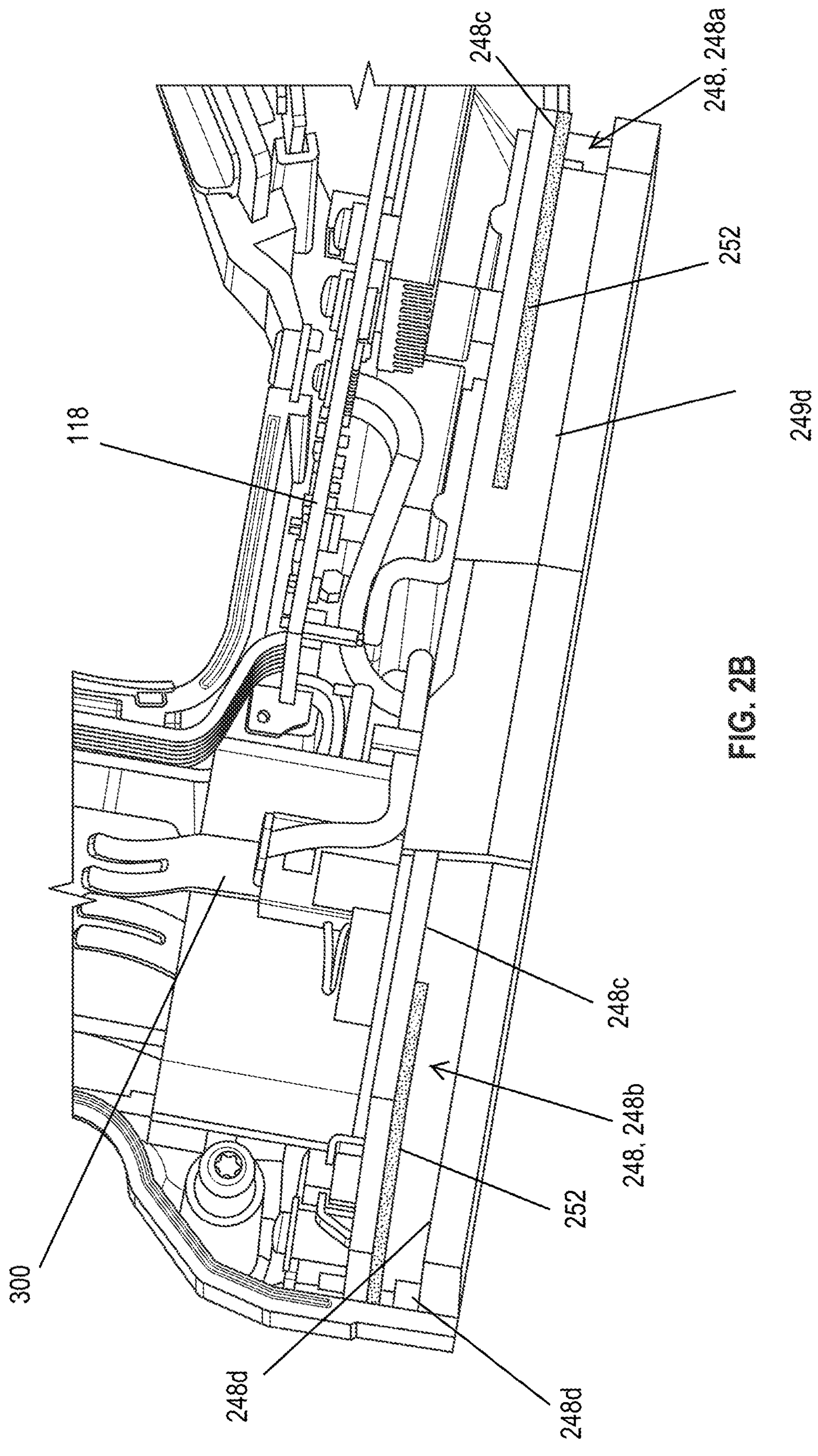
FIG. 2B is a perspective view of the power tool of FIG. 1A with a portion of the housing removed and further including a gasket coupled to the battery pack receptacle.
Figure 3:
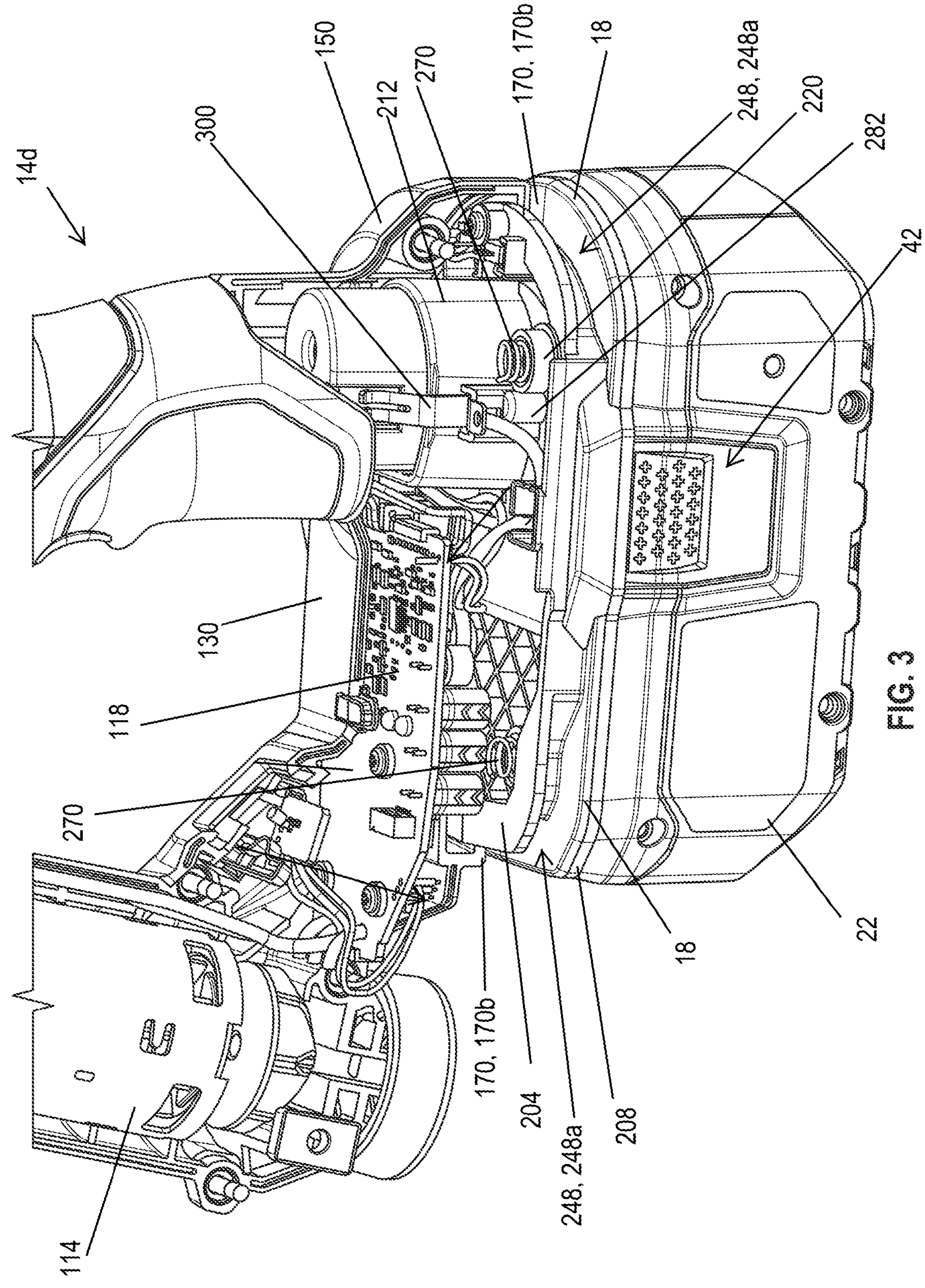
FIG. 3 is another perspective view of the power tool of FIG. 1A with a portion of the housing removed.

As shown in FIG. 2B, in some embodiments, an elastic member 252 (e.g., a gasket) may be adhered to a surface that defines the groove 248. In FIG. 2B, the elastic member is adhered to a top surface 248*c* that defines the groove 248. The elastic member 252 may be formed from rubber, foam, or any suitable material (e.g., a deformable material). In other embodiments, the elastic member 252 may be adhered to a bottom surface 248*d* that defines the groove 248 or both the top surface 248*c* and the bottom surface 248*d*.

Figure 8:
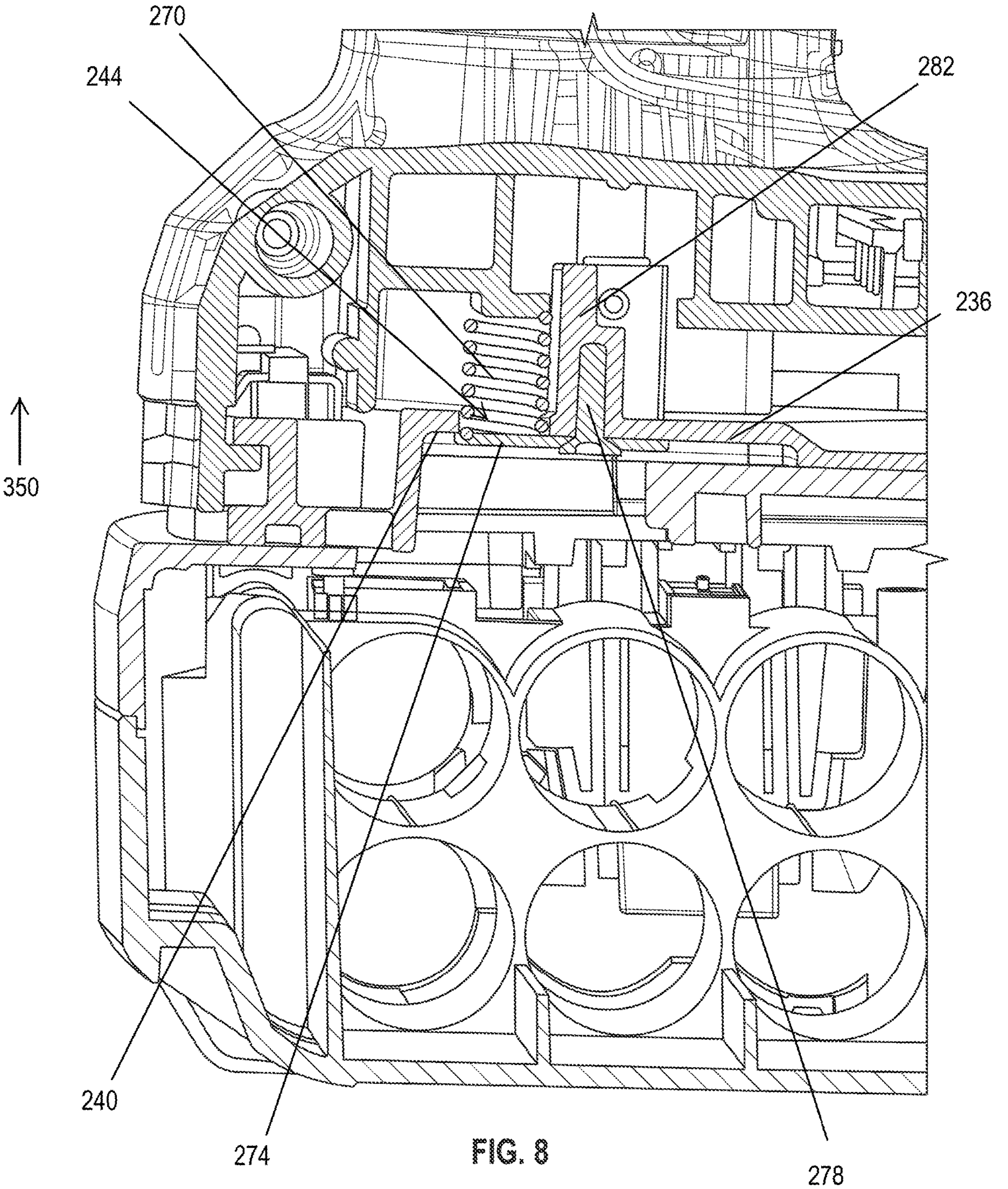
FIG. 8 is a detailed cross-sectional view of the power tool of FIG. 1A along the line 8-8 of FIG. 1A.
Figure 9:
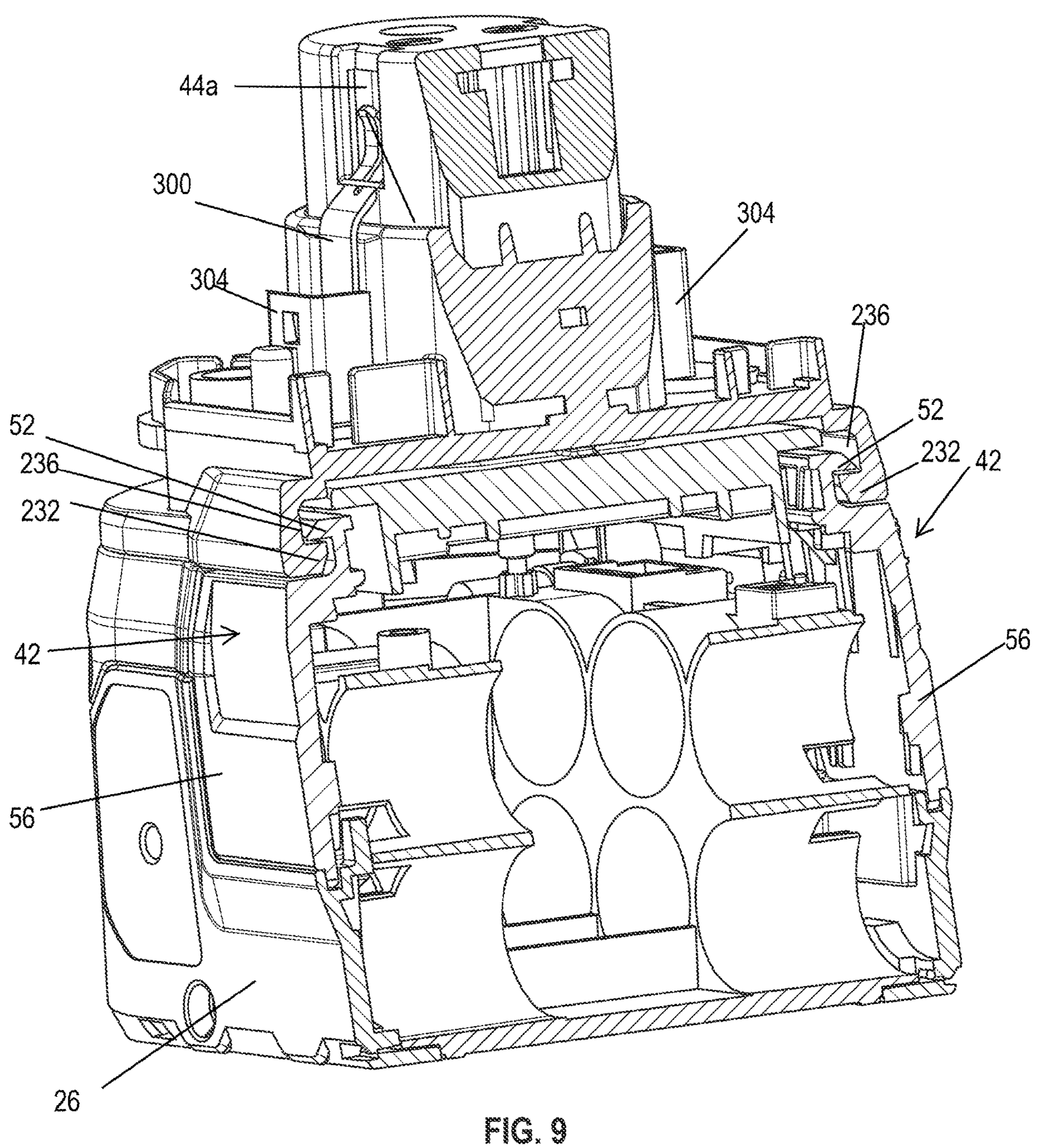
FIG. 9 is a cross-sectional view of the battery pack receptacle and the battery pack 22 of FIG. 1A along the line 9-9 of FIG. 1A.

One or more biasing mechanisms, such as one or more springs 270 (e.g., coiled springs, leaf springs, and/or the like) or one or more resilient bodies (e.g., elastic bumpers or supports), may be coupled to the top surface 204 of the body 200 of the battery pack receptacle 18. In the illustrated embodiment, there are four springs 270. Two of the springs 270 may be positioned proximate the front end of the battery pack receptacle 18. Each of the rear springs 270 may be received by the rear bosses 220 in the top surface 204 via insertion through the corresponding aperture 244. A plate 274 may be positioned in each of the recesses 240 to close the corresponding aperture 244 and be secured to the battery pack receptacle 18 via a fastener 278 (e.g., a screw or the like; FIG. 8). In the illustrated embodiment, the fasteners 278 are each received in a corresponding post 282 that extends from the top surface 204. Accordingly, the springs 270 may be constrained relative to the battery pack receptacle 18 by walls of the bosses 220 and the plates 274.

Figure 4B:
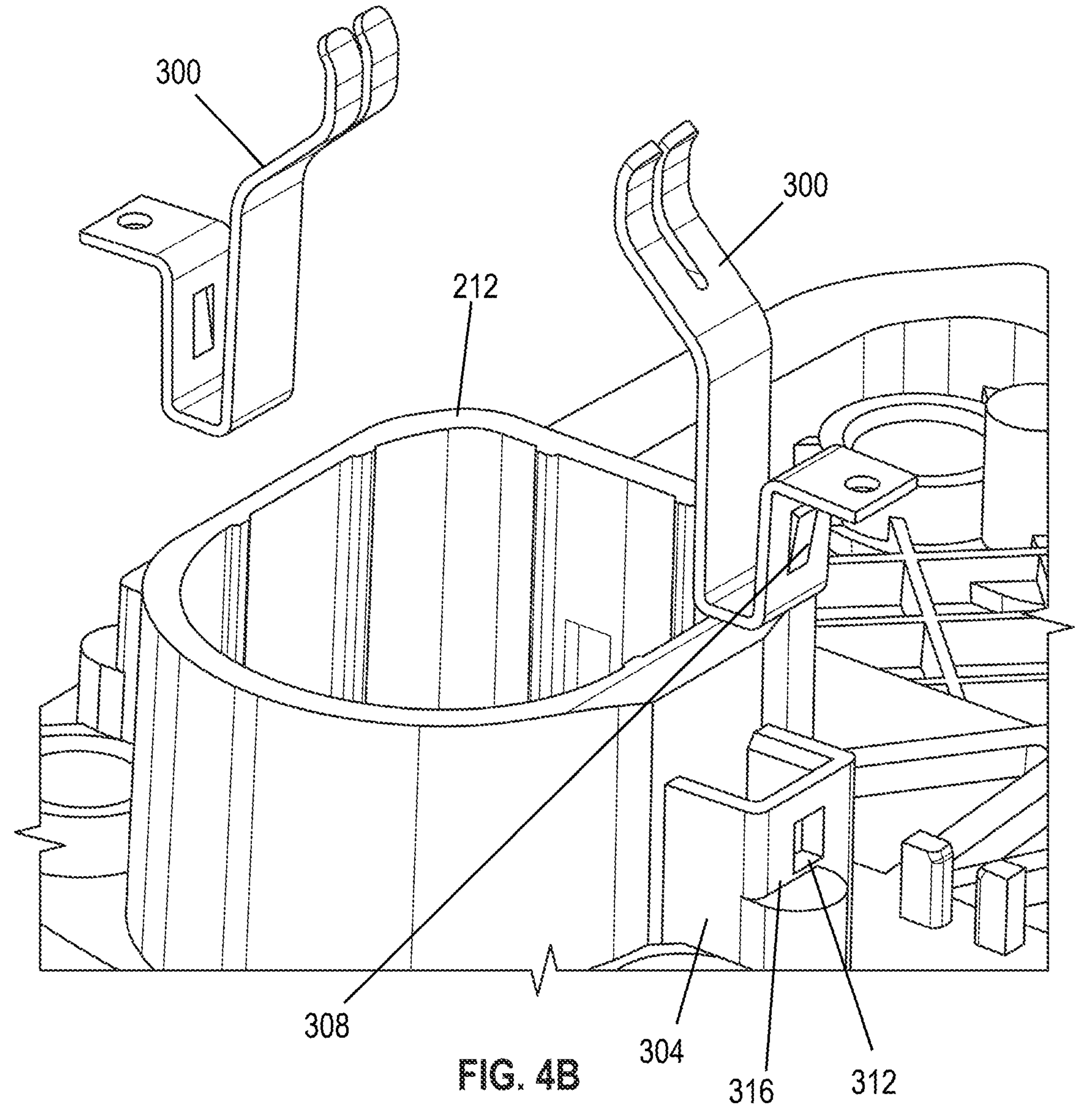
FIG. 4B is a detailed exploded view of power tool terminals and the battery pack receptacle of FIG. 4A.
Figure 4C:
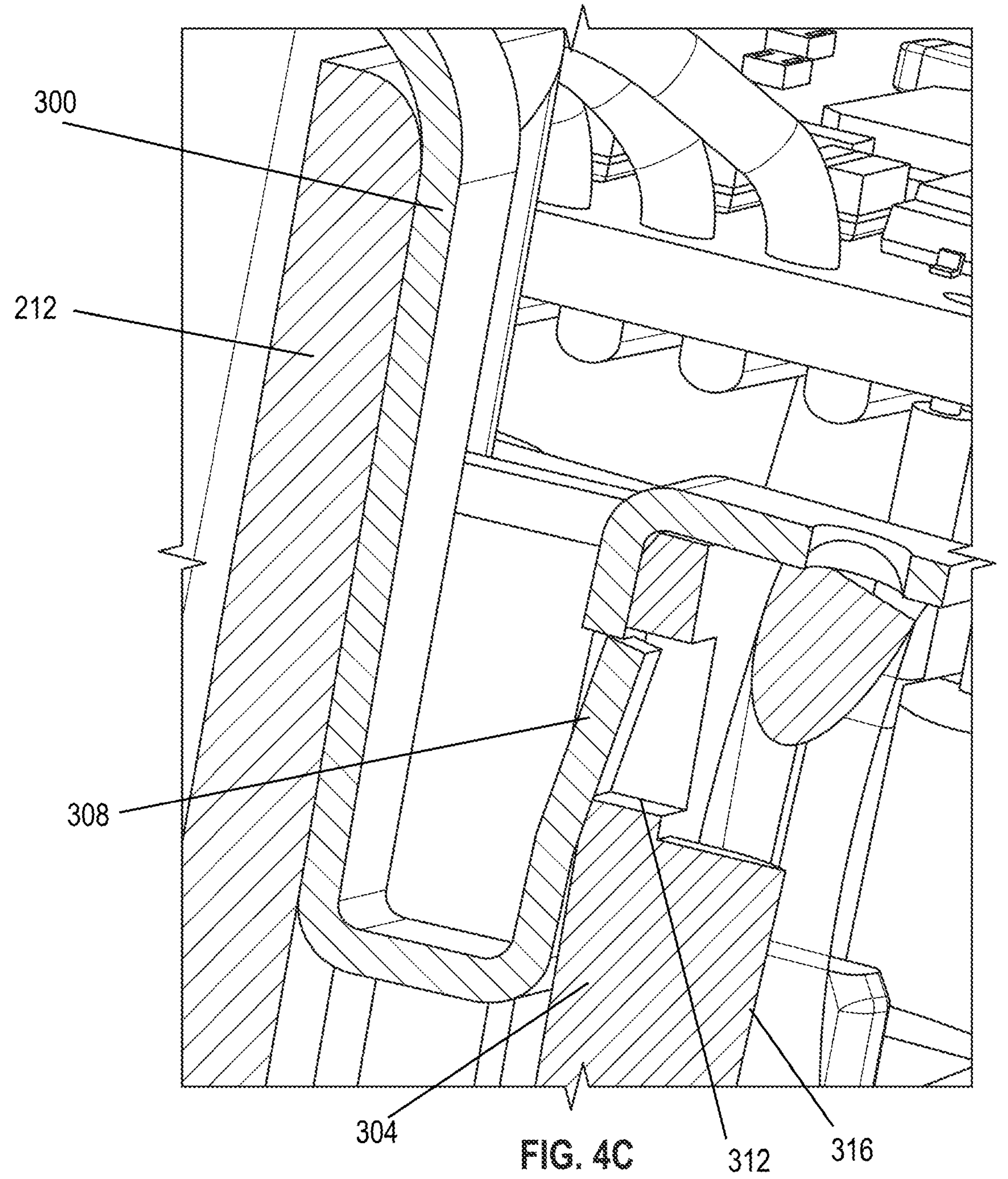
FIG. 4C is a cross-sectional view of the power tool terminals and the battery pack receptacle of FIG. 4B, when assembled, along the line 4C-4C of FIG. 2A.

A pair of power tool terminals 300 are supported by the battery pack receptacle 18 (FIG. 4B). In the illustrated embodiment, each of the power tool terminals 300 is coupled to the top surface 204 on opposite sides of the projection 212. In particular, and with reference to FIGS. 4A and 4B, each of the power tool terminals 300 is an elongate conductive member including a first end that is coupled to a respective bore 304 positioned adjacent the projection 212 and a second end that is spaced apart from an end of the projection 212. As shown in FIGS. 4A-4C, the first end of each of the power tool terminals 300 includes a detent 308 that is received in an aperture 312 in a wall 316 of the bore 304. Accordingly, in the illustrated embodiment, the power tool terminals 300 may be snap-fit or otherwise interlocked with the battery pack receptacle 18, which minimizes decoupling of the power tool terminals 300 that otherwise may be caused by vibration. The power tool terminals 300 are in electrical communication with the printed circuit board 118. In the illustrated embodiment, the power tool terminals 300 are electrically coupled to the printed circuit board 118 via wires 320 (FIG. 4A) that extend therebetween and through apertures in the inner wall 154.

A pair of auxiliary power terminals 324 may be supported by the battery pack receptacle 18. In the illustrated embodiment, each of the auxiliary power tool terminals 324 is positioned in an opening 328 (FIG. 5) in the inner surface 236 of the battery pack receptacle cavity 228. The auxiliary power terminals 324 may be positioned adjacent the rear end of the battery pack receptacle 18. In particular, each of the pair of auxiliary power terminals 324 is an elongate conductive member including a first end positioned within the openings 328 and accessible in the battery pack receptacle cavity 228, and a second end that is coupled to the top surface 204. The pair of auxiliary power terminals 324 are in electrical communication with the printed circuit board 118. In the illustrated, the power tool terminals 300 are electrically coupled to the printed circuit board 118 via wires 332 (FIG. 4A) that extend therebetween and through apertures in the inner wall 154.

As mentioned above, the battery pack receptacle 18 is movably coupled to the battery pack attachment portion 130 of the housing 14. In particular, the projection 212 extends through the opening 166 in the inner wall 154 such that the end of the projection 212 is positioned within the housing 14 (e.g., the second portion 14*d* of the housing 14), the top surface 204 is positioned within the housing cavity 168, and the flange 170 of the outer wall 150 is received in the groove 248. In other embodiments, the battery pack receptacle 18 may include a flange 170 and the housing 14 may include a complementary groove in which the flange 170 is received. Regardless, the springs 270 may be positioned between the inner wall 154 of the housing 14 and the top surface 204 of the battery pack receptacle 18. The springs 270 allow the battery pack receptacle 18 to move (e.g., float) relative to the housing 14 (e.g., the battery pack attachment portion 130). Importantly, because the power tool terminals 300 and the auxiliary power tool terminals 324 are coupled to the battery pack receptacle 18, the power tool terminals 300 and the auxiliary power tool terminals 324 move therewith. Additionally, an overlap distance OD between a portion of the flange 170 and a portion of the groove 248 retains the battery pack receptacle 18 relative the housing 14, thereby preventing removal of the battery pack receptacle 18 from the housing 14. In this illustrated embodiment, the overlap distance OD is approximately 2.5 mm, although in other embodiments the overlap distance OD may be between approximately 1.0 mm and 4.0 mm. The term "approximately" as used herein means plus or minus 0.1 mm.

In some embodiment (e.g., FIGS. 1-11), the springs 270 may be configured as compression springs 270 and the battery pack receptacle 18 may move in a first direction (e.g., generally vertical direction) represented by arrow 350. That is, the springs 270 may be preloaded in a compressed state at all times. In this case, the battery pack receptacle 18 can move from a first position (FIG. 8) in which the flange 170 abuts the top surface 248*c* of the groove 248 and the springs 270 are in a first compressed state to a second position (FIG. 10) in which the flange 170 is spaced apart from top surface 248*c* of the groove 248 and the springs 270 are in a second compressed state. In the second position the flange 170 may be positioned between the bottom surface 248*d* and the top surface 248*c* or may abut the bottom surface 248*d*, depending on the amount of vibration and impact experienced by the power tool 10. The battery pack receptacle 18 moves in the first direction 350 when moving from the second position to the first position, and in a second direction, which is in a direction opposite the first direction 350, when moving from the first position to the second position. The first direction 350 is generally toward the housing and the second direction is generally away from the housing. In these embodiments, because the springs 270 are preloaded in a compressed state, the battery pack receptacle 18 is biased into the first position. Additionally, when the battery pack receptacle 18 moves from the first position to the second position, the springs 270 compress further. That is, the springs 270 are more compressed in the second position than in the first position.

Figure 10:
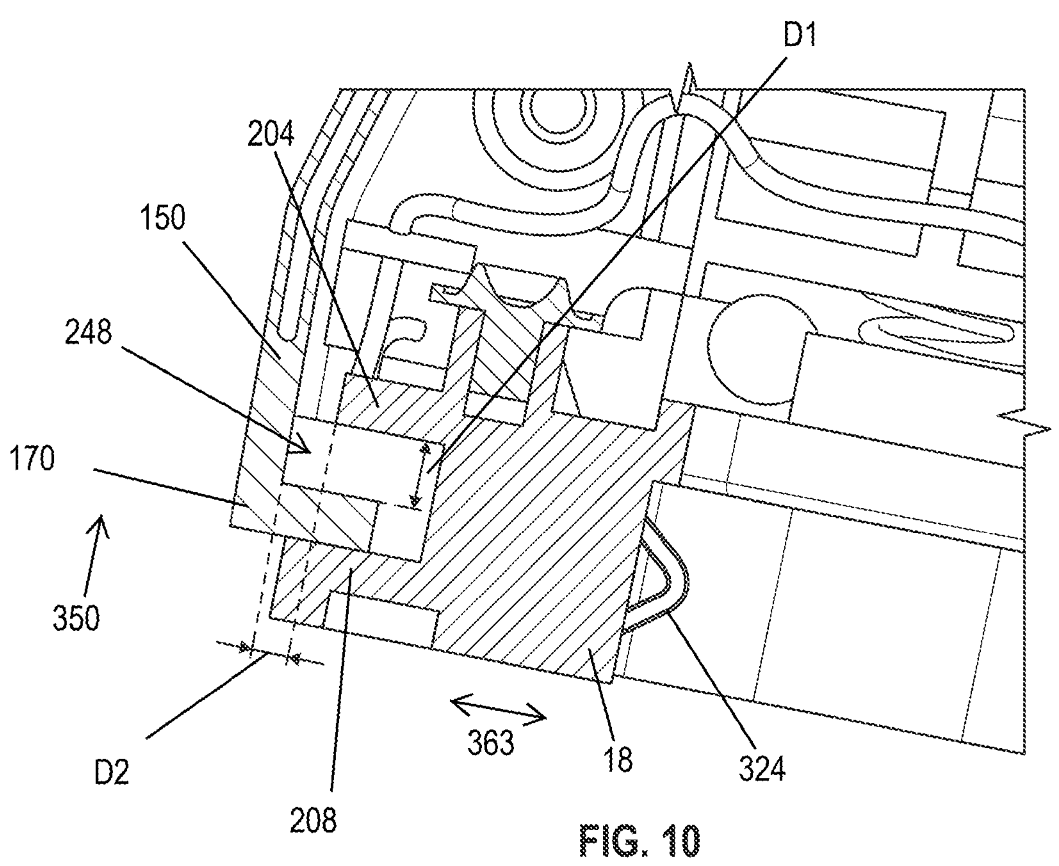
FIG. 10 is a detailed cross-sectional view of the power tool of FIG. 1A along the line 10-10 of FIG. 1A.
Figure 11:
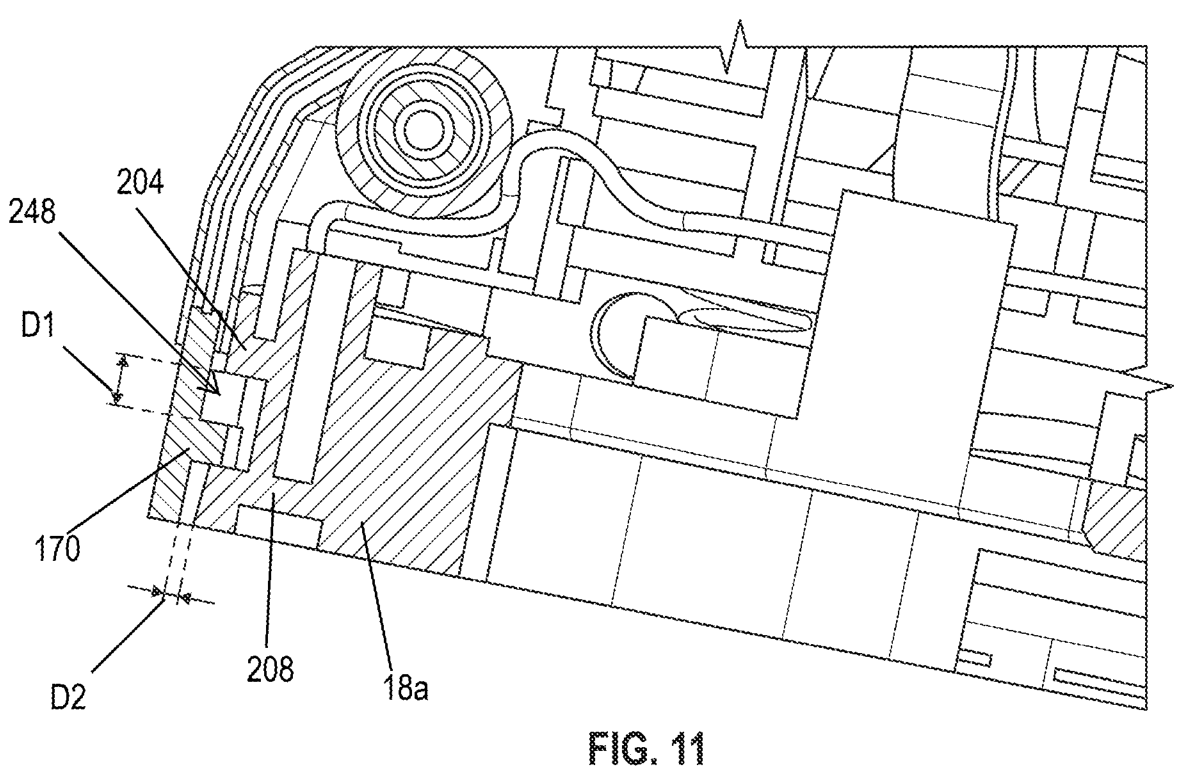
FIG. 11 is a detailed cross-sectional view of another embodiment of the power tool and the battery pack receptacle of FIG. 1A along the line 11-11 of FIG. 1A.
Figure 12:
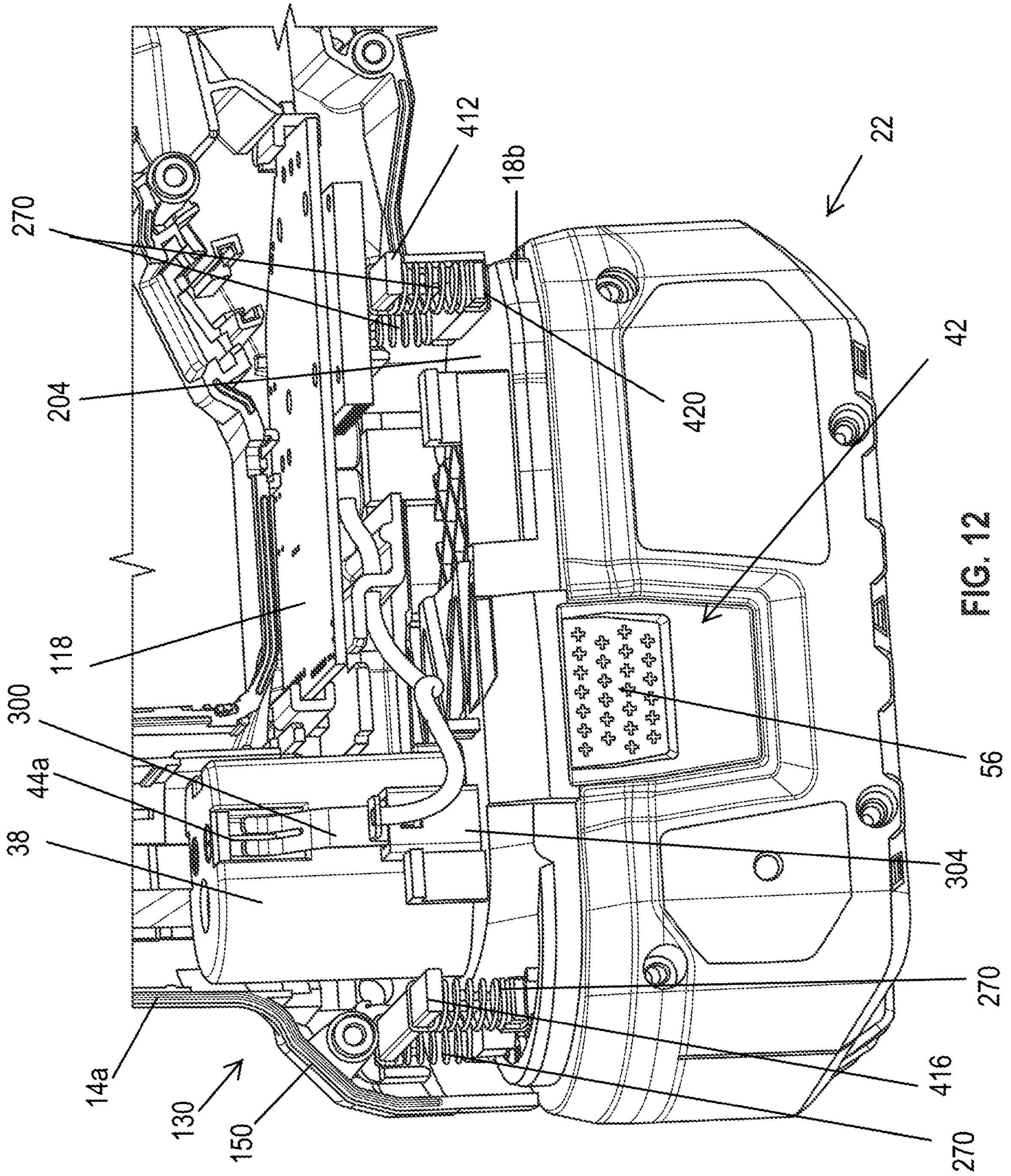
FIG. 12 is a perspective view of the power tool of FIG. 1A having a battery pack receptacle according to another embodiment, a portion of the housing is removed.

As shown relative to FIG. 10, a first distance D1 exists between the top surface 248*c* of the groove 248 and a top surface 170*c* of the flange 170 in the first position. Accordingly, the housing 14 and the battery pack receptacle 18 can move relative to one another in the second direction by the amount of the first distance D1 when moving between the first position to the second position. Additionally, a second distance D2 exists between a side surface of the top surface 204 and the inner side surface 158 of the outer wall 150. The housing 14 and the battery pack receptacle 18 can move relative to one another in a second direction denoted by arrow 363 (which is generally in the front to rear direction of the power tool 10) and a third direction 365 (which is generally in a side-to-side direction, see FIG. 1) by the amount of the respective second distance D2. The second direction 363 and the third direction 365 are generally perpendicular to the first direction 350. Accordingly, the battery pack receptacle 18 and the housing 14 (e.g., the battery pack attachment portion 130) can move relative to one another in three directions, such that the battery pack receptacle 18 is able to absorb vibration and impact in at least the first direction 350. In the embodiment of FIG. 10, the first distance D1 is approximately 3 mm and the second distance D2 is approximately 2 mm. In other embodiments, the first distance D1 and the second distance D2 may have other values. For example, with respect to the battery pack receptacle 18*a* of embodiment of FIG. 11, the first distance D1 is approximately 2 mm and the second distance D2 is approximately 0.5 mm. The first distance D1 may range from approximately 1 mm to approximately 4 mm, while the second distance D2 may range from approximately 0.5 mm to approximately 3 mm.

The battery pack receptacle 18 is configured to receive the battery pack 22. The hollow projection 212 is configured to receive the stem 38 of the battery pack 22 along a first insertion direction. In the illustrated embodiment, the first insertion direction is generally in the same direction as the first direction 350. That is, the hollow projection 212 and the opening 216 in the battery pack receptacle 18 receives the stem 38 of the battery pack 22 and the top surface 26*a* of the housing 26 is received in the battery pack receptacle cavity 228. Accordingly, the battery pack terminals 44*a* are configured to engage and electrically connect to the power tool terminals 300 to supply electrical current to the printed circuit board 118. Also, the auxiliary battery pack terminals 44*b* are configured to engage and electrically connect to the auxiliary power tool terminals 324 for data communication between the power tool 10 and the battery pack 22. Also, the projections 54 of the latches 52 engage the respective projection 232 of the battery pack receptacle 18 to retain the battery pack 22 to the battery pack receptacle 18 and therefore the housing 14.

Because the battery pack receptacle 18 can move relative to the housing 14, so too can the battery pack 22. The ability for the battery pack 22 to move relative to the housing 14 protects the battery pack 22 against vibration and/or forceful impacts during use of the power tool 10. This is because the springs 270 advantageously function as shock absorbers and obviate or minimize transmission of vibration to the battery pack 22. For example, when the piston 86 impacts the bumper 94 in the BDC position as shown in FIG. 1B, the housing 14 may experience a large acceleration (i.e., recoil), causing the housing 14 to move relative to the battery pack receptacle 18 which, in turn, compresses the springs 270. If the recoil is sufficiently large, the battery pack receptacle 18 may bottom-out against the housing 14, in which case the top surface 248*c* and/or elastic member 252, when used, can therefore help absorb excess energy from movement of the battery pack receptacle 18. Moreover, because the power tool terminals 300 and the auxiliary power tool terminals 324 are coupled to and supported by the battery pack receptacle 18, the power tool terminals 300, the auxiliary power tool terminals 324, and the corresponding battery pack terminals 44*a*, 44*b* (mated therewith) are protected against forceful impacts during use of the power tool 10. Another feature of the battery pack receptacle 18 is that any forceful impacts transmitted from the housing 14 to the battery pack 22 do not occur through the latch mechanisms 42, which is typical in conventional designs. In this way, the power tool 10 may be more robust, and may exhibit an increased lifetime.

The battery pack receptacle 18 may be coupled to the housing 14 of power tool 10 using the following method of assembly. The first portion 14*c* and the second portion 14*d* may be positioned on opposite sides of the battery pack receptacle 18. While in the first position, each of the springs 270 may be inserted into the space between the inner top surface 162 of the outer wall 150 and the inner wall 154 by via the aperture 244 that is in communication with the corresponding boss 220. Once positioned within the space, one of the plates 274 is positioned within each of the recesses 240 in the inner surface 236 of the battery pack receptacle cavity 228 to close the apertures 244. The fastener 278 couples the plate 274 to the battery pack receptacle 18. Accordingly, the springs 270 may be included in the power tool 10 after battery pack receptacle 18 is positioned within the housing 14.

The housing 14 of the power tool 10 and the battery pack receptacle 18 may have other configurations, as shown in FIGS. 12-18. The embodiments of FIGS. 12-18 are like the embodiments of FIGS. 1-12, so in the following description, like reference numerals will be used for like structure and only the differences will be described.

Figure 13:
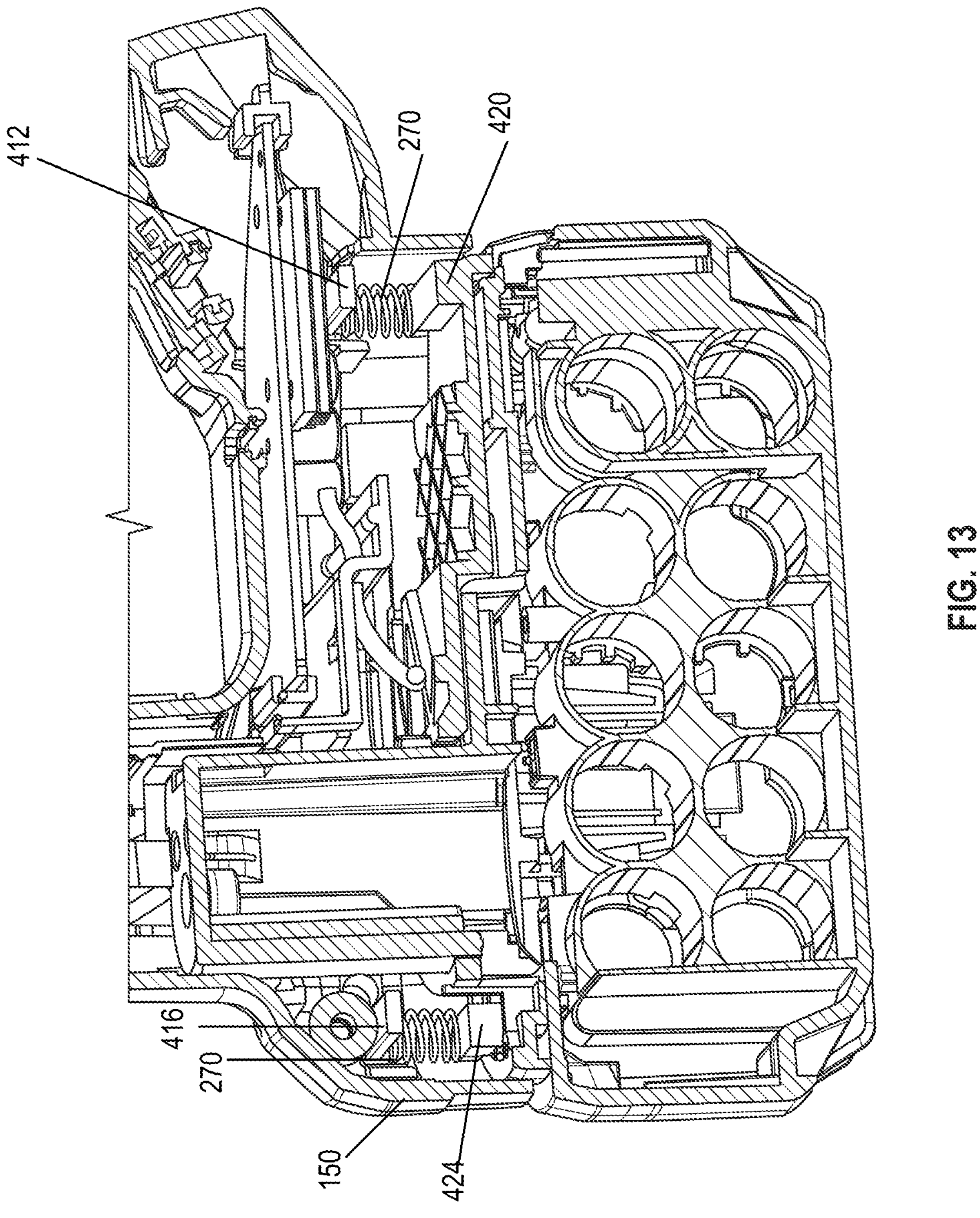
FIG. 13 is a cross-sectional view of the power tool of FIG. 12 along the line 13-13 of FIG. 1A.
Figure 14:
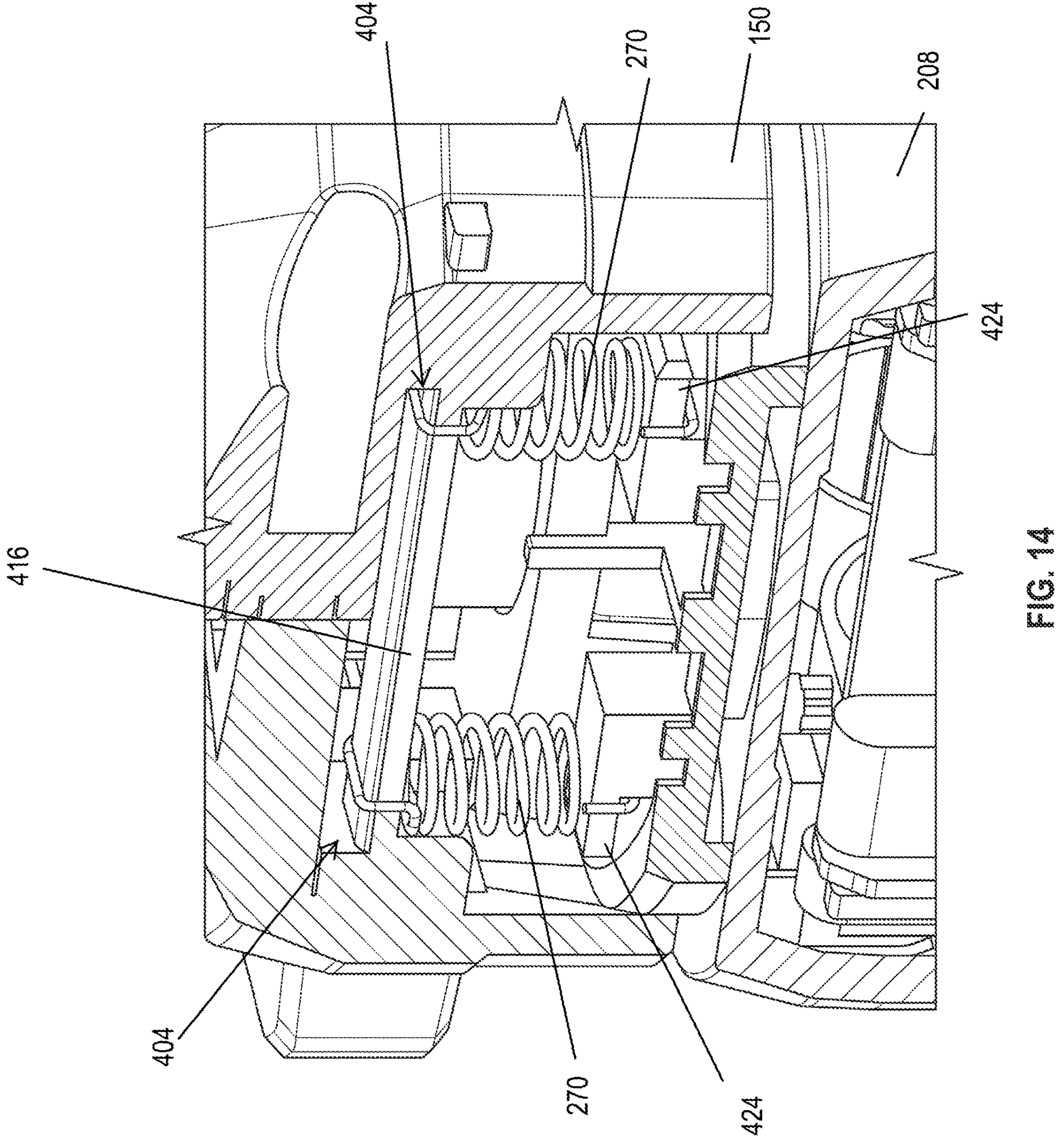
FIG. 14 is another cross-sectional view of the power tool of FIG. 12 along the line 14-14 of FIG. 1A.
Figure 15:
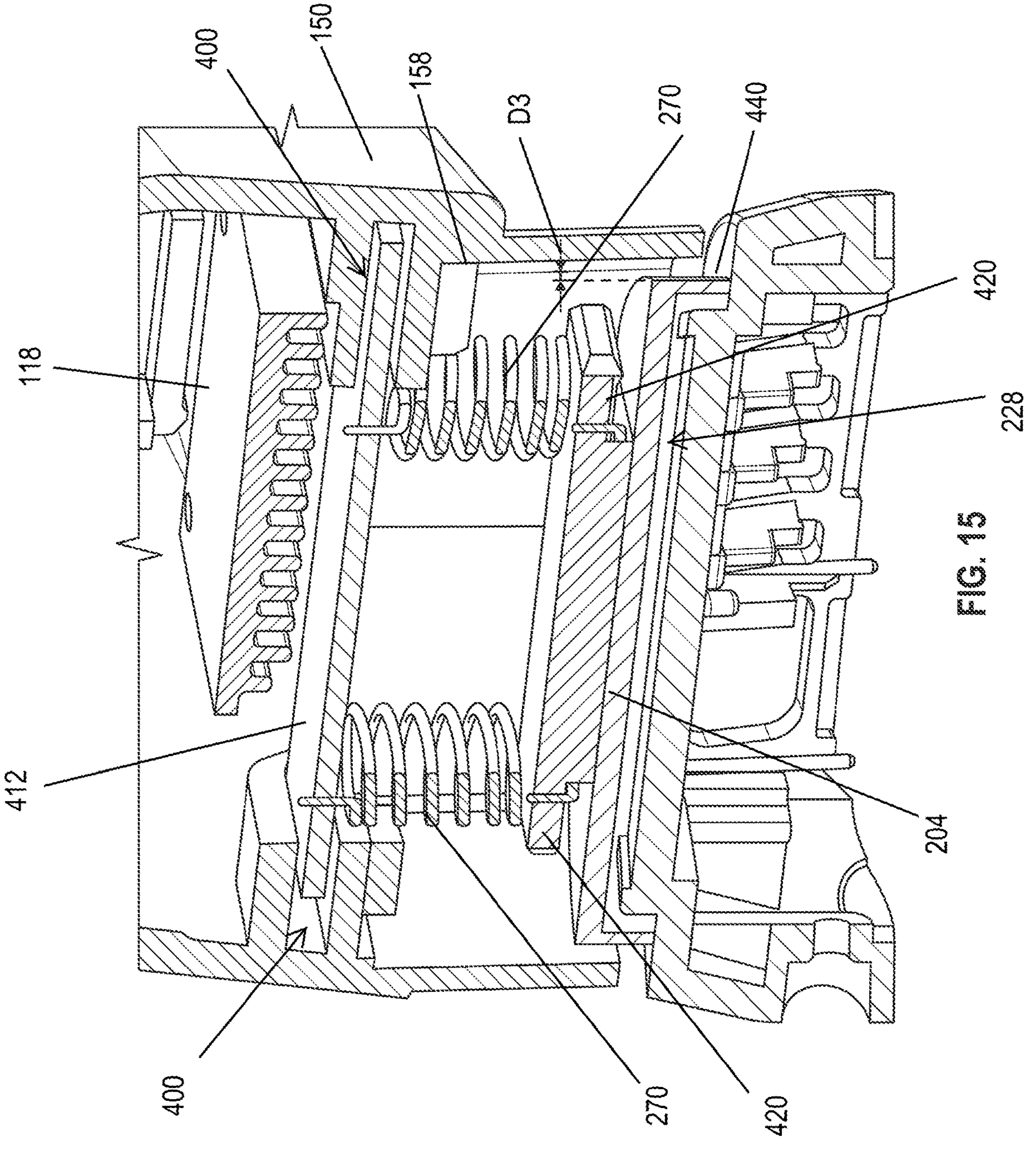
FIG. 15 is a cross-sectional view of the power tool of FIG. 12 along the line 14—of FIG. 1A.

With respect to the embodiment of FIGS. 12-15, the outer wall 150 of the battery pack attachment portion 130 does not have flange and the battery pack receptacle 18*b* does not have a groove. Rather, the outer wall 150 is positioned outward from an outer surface of the body 200 of the battery pack receptacle 18*b*. Additionally, the springs 270 may be coupled between the housing 14 and the battery pack 22 in a different manner. As shown in FIGS. 14 and 15, each of the first housing piece 14*a* and the second housing piece 14*b* includes a front groove 400 and a rear groove 404. The front grooves 400 of the first housing piece 14*a* and the second housing piece 14*b* are aligned and support a front support member 412 (e.g., elongate bar; FIG. 13). Similarly, the rear grooves 404 of the first housing piece 14*a* and the second housing piece 14*b* are aligned and support a rear support member 416 (e.g., elongate bar). The top surface 204 has a pair of front projections 420 and a pair of rear projections 424. In the illustrated embodiment, the front pair of projections 420 are formed from a front T-shaped member. The front and rear projections 420, 424 are aligned with the respective front and rear support members 412, 416. A first end of each of the springs 270 is coupled to one of the projections 428 and an opposite, second end of each of the springs 270 is coupled to the corresponding support member 412, 416.

In the embodiment of FIGS. 12-15, the springs 270 are not preloaded in compression or tension in an initial position. Rather, the springs 270 are in a free state in the initial position. Accordingly, the battery pack receptacle 18*b* may be movable in the first direction 350 from the initial position such that the springs 270 are compressed and may be movable in a direction opposite the first direction 350 from the initial position such that the springs 270 are expanded. The springs 270 are biased into the initial position.

Like the embodiment of FIGS. 1-11, the battery pack receptacle 18*b* of FIGS. 12-15 can move relative to the housing 14 in three directions, such that to the battery pack receptacle 18*b* can absorb vibration and impact in at least the first direction 350. As shown relative to FIG. 15, a distance D3 exists between the outer surface 440 of the battery pack receptacle 18*b* and an inner side surface 158 of the outer wall 150. The housing 14 and the battery pack receptacle 18*b* can move relative to one another in the second direction 363 and third direction 365 by the amount of the distance D3. In the embodiment of FIG. 15, the distance D3 is approximately 2 mm. The distance D3 may range from approximately 0.5 mm to approximately 3 mm.

Figure 16:
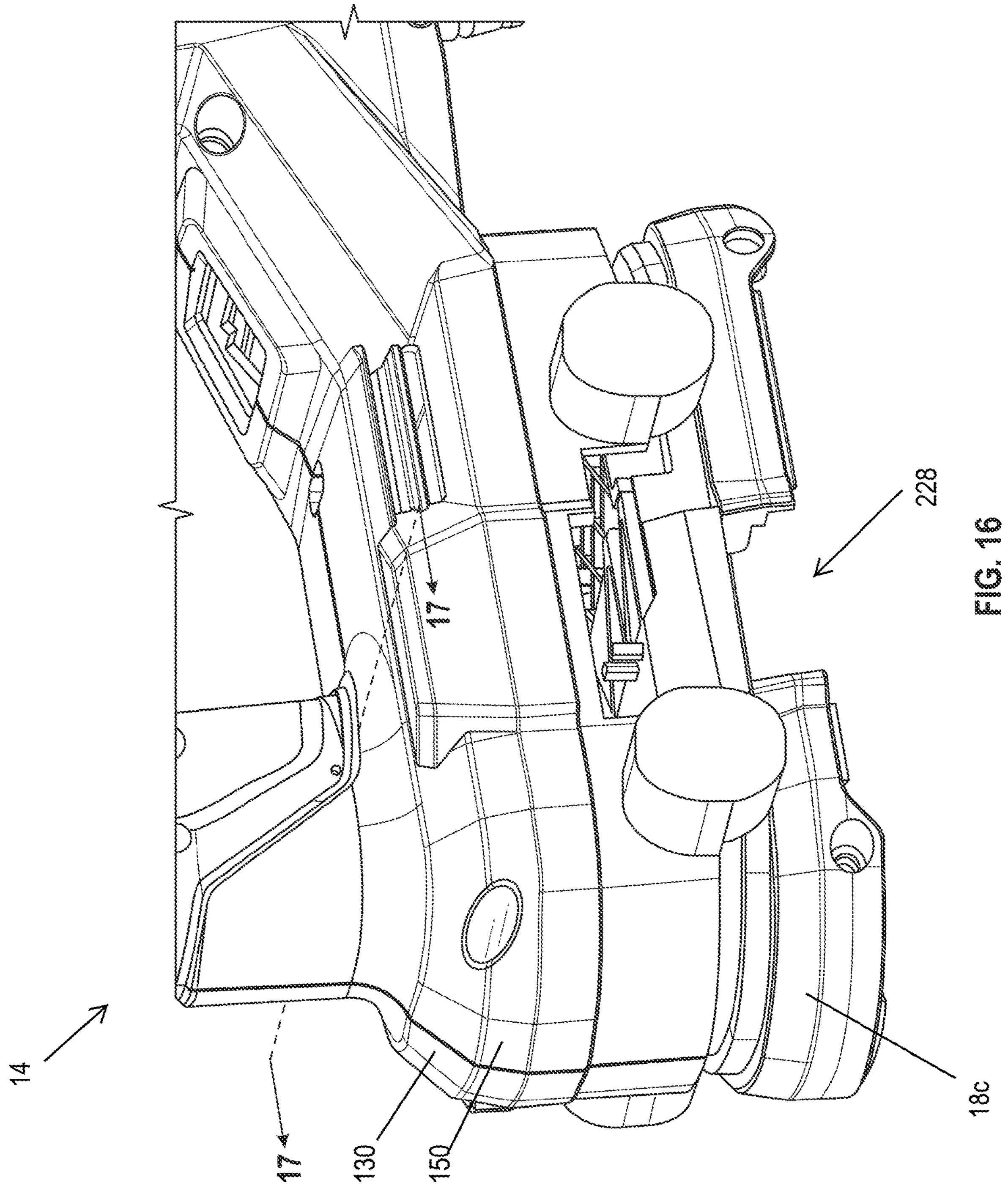
FIG. 16 is a perspective view of the power tool of FIG. 1A having a battery pack receptacle according to another embodiment, a portion of the housing is removed.
Figure 17:
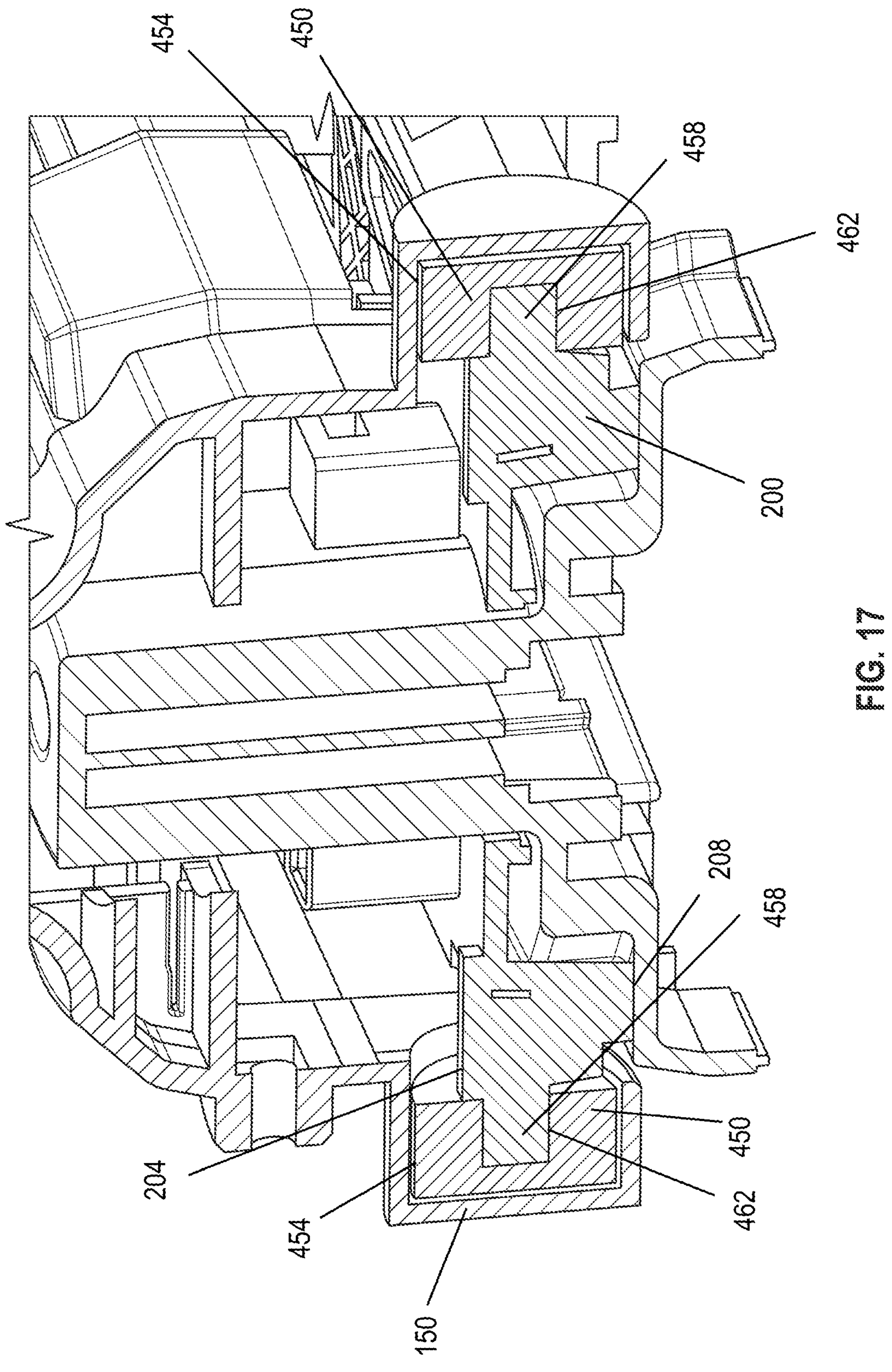
FIG. 17 is a cross-sectional view of the power tool of FIG. 16 along the line 17-17 of FIG. 16.
Figure 18:
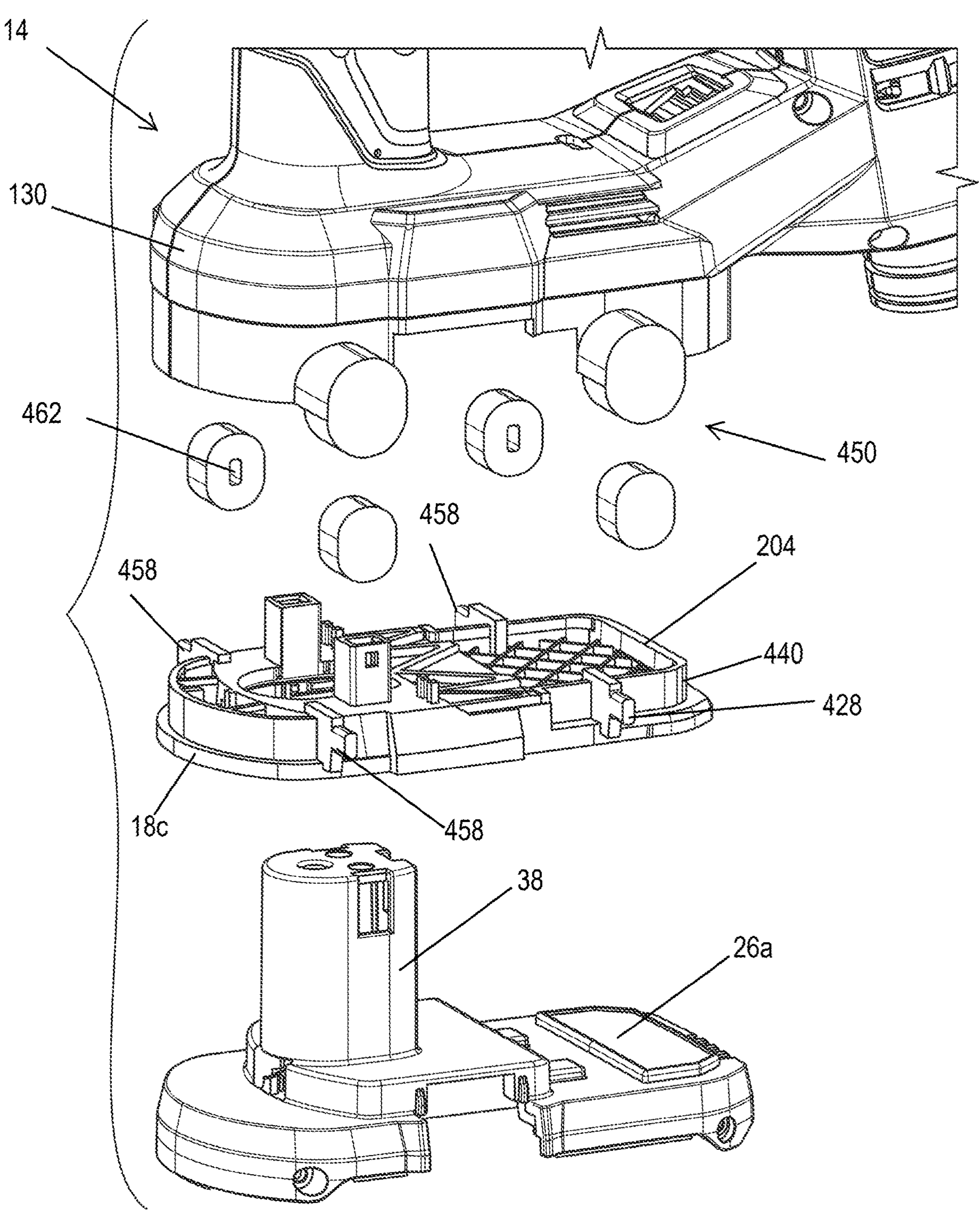
FIG. 18 is an exploded view of the power tool of FIG. 16.
Figure 19:
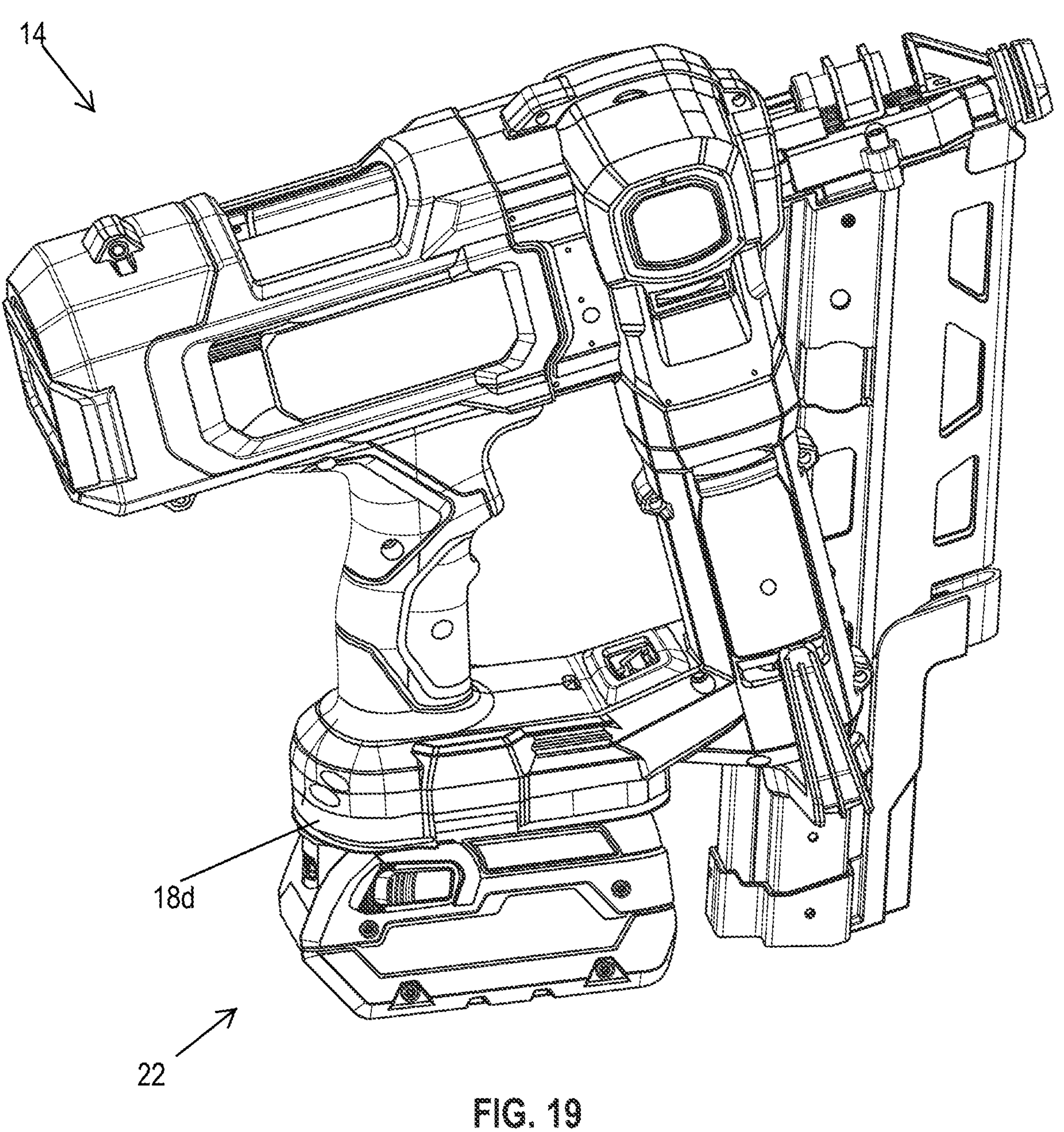
FIG. 19 is a perspective view of a power tool, such as a powered fastener driver, including a housing, a battery pack receptacle according to another embodiment, and a battery pack coupled to the battery pack receptacle.
Figure 20:
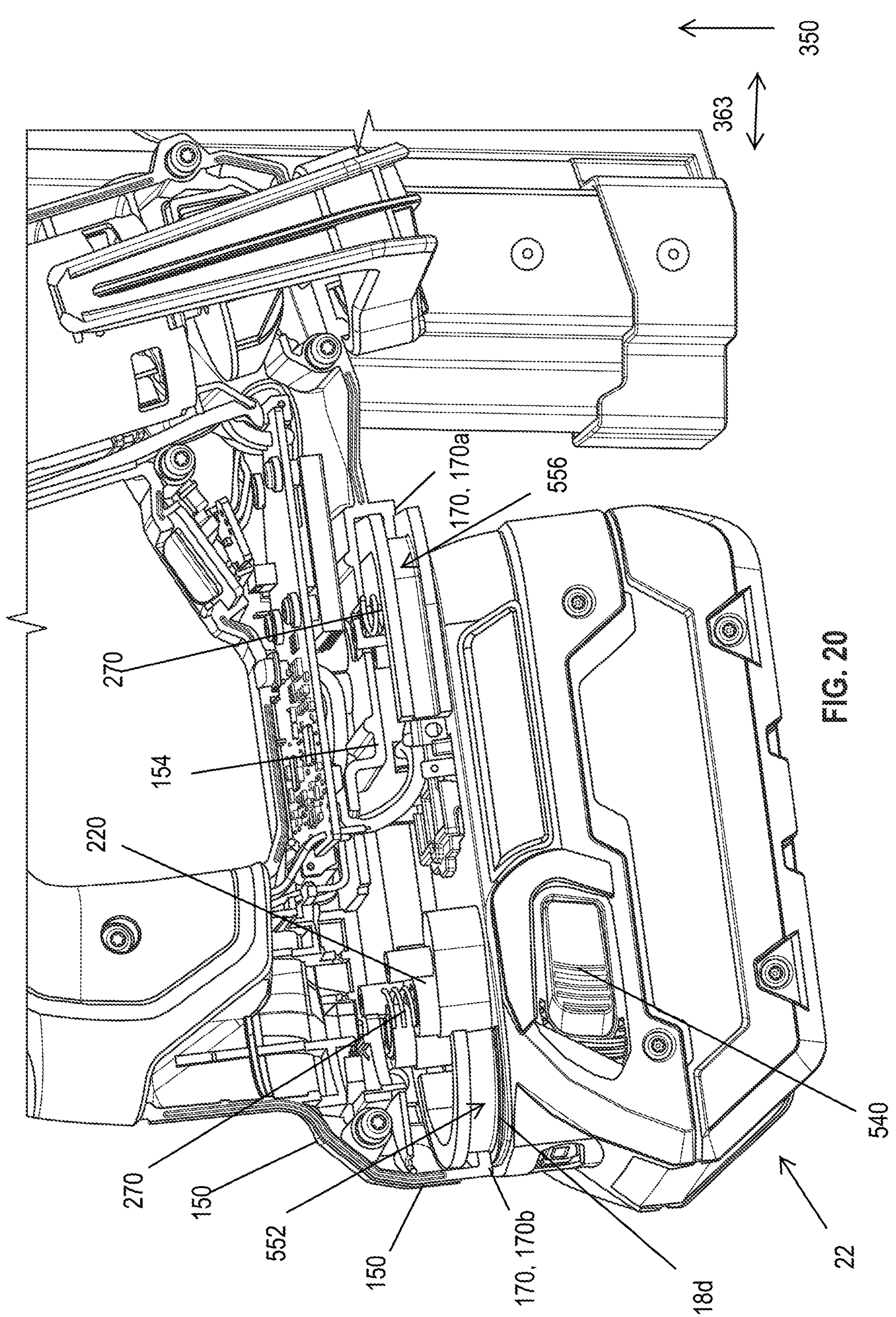
FIG. 20 is a detailed perspective view of the power tool of FIG. 19 with a portion of the housing removed.
Figure 21:
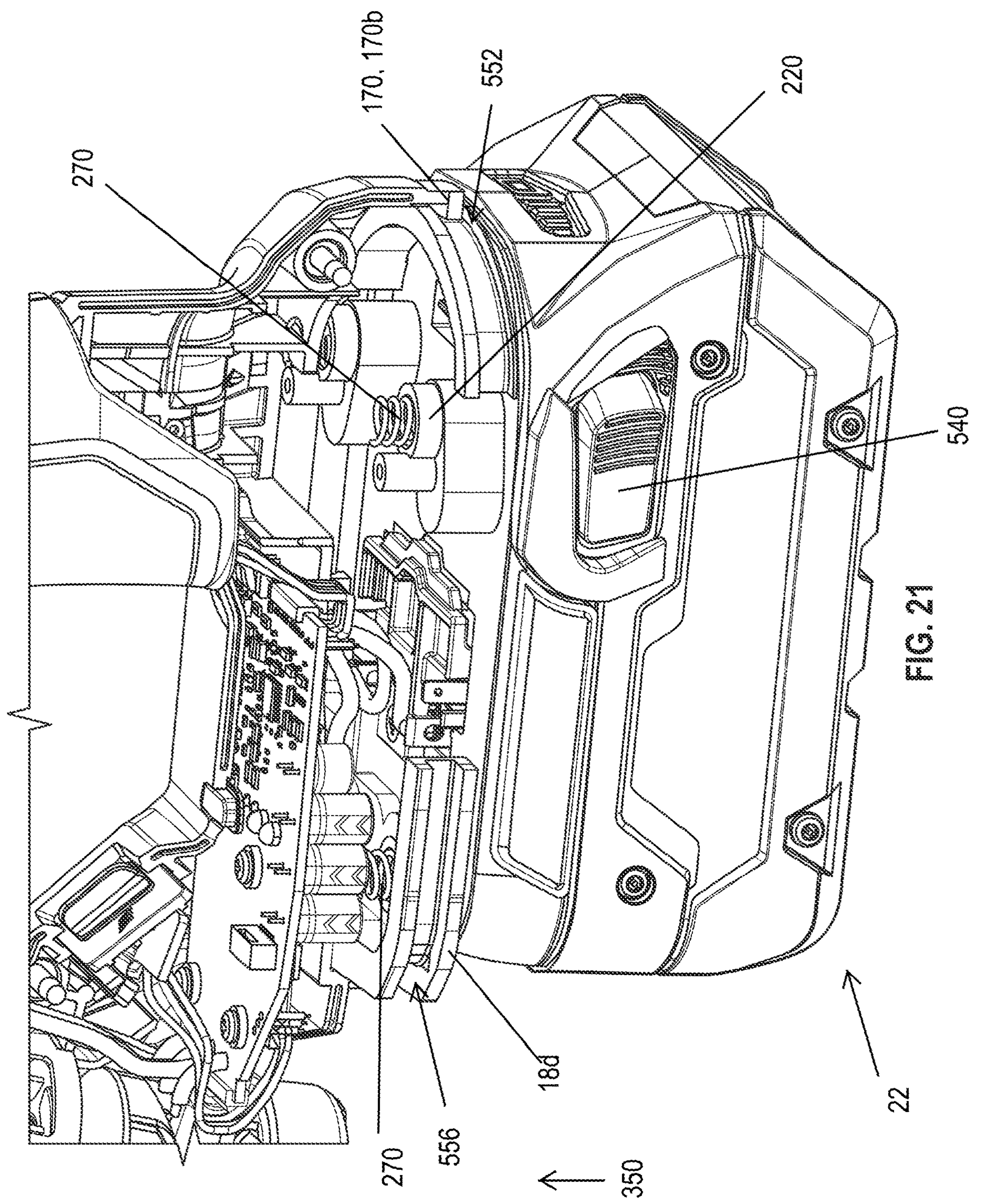
FIG. 21 is another detailed perspective view of the power tool of FIG. 19 with a portion of the housing removed.

In the embodiment of FIGS. 16-18 the springs are omitted. Rather, a plurality of elastic supports 450 are positioned between the battery pack attachment portion 130 and the battery pack receptacle 18*c*. In the illustrated embodiment, the elastic support 450 are formed from foam silicone, although other suitable materials may be used instead. In the illustrated embodiment, the battery pack attachment portion 130 includes recesses 454 in the inner side surface 158 of the outer wall 150. In the illustrated embodiment, there are four recesses 454—two recesses 454 are adjacent the front end and two recesses 454 are adjacent the rear end. Additionally, in the illustrated embodiment, the battery pack receptacle 18*c* includes a plurality of projections 458 extending outward from the outer surface 440 of the body 200. In the illustrated embodiment, there are four projections 458—two of the projections 458 are adjacent the front end and two of the projections 458 are positioned adjacent the rear end. As shown, each of the projections 458 aligns with and is received within a corresponding recess 454 when the battery pack receptacle 18*c* is positioned within the housing 14.

Additionally, each of the elastic support 450 may be positioned between a corresponding projection 458 and recess 454. The elastic support 450 have an outer surface that is complementary to the size and shape of the recess 454 and a bore 462 extending partially or fully therethrough that is complementary to the size and shape of the projection 458. In the illustrated embodiment, the elastic supports 450 are substantially cylindrical to match the cylindrical shape of the recess 454 and the bore 462 is substantially ovular to the match the ovular shape of the projection 458. In other embodiments, the recesses 454, the projections 458, and the elastic support 450 may have other suitable sizes and shapes. In other embodiments, there may be more or fewer projections 459 and recesses 454 pairs and therefore more or fewer elastic members 454. The elastic members 454 of the embodiment of FIGS. 16-18 can absorb vibration and impact in all directions 350, 363, 365.

Any of the embodiments of FIGS. 1-18 may be used with a slide-on battery pack 22 rather than a stemmed battery pack 22 (i.e., a battery pack with stem 38). FIGS. 19-24 illustrate such an embodiment. Again, the embodiments of FIGS. 19-24 are like the embodiments of FIGS. 1-12, so in the following description, like reference numerals will be used for like structure and only the differences will be described.

Figure 22:
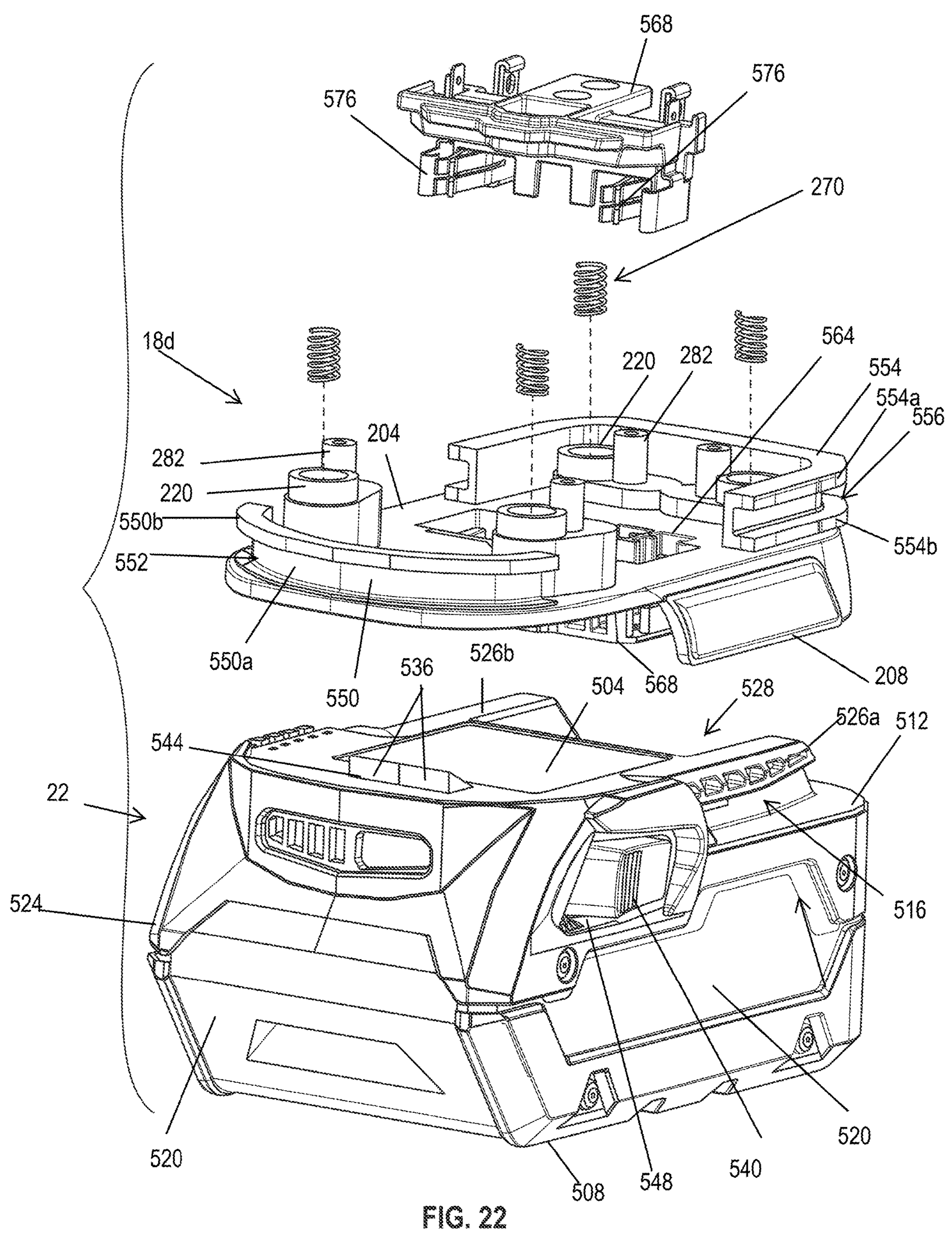
FIG. 22 is an exploded view of the battery pack receptacle and the battery pack of the power tool of FIG. 19.

As shown in FIG. 22, the slide on battery pack 22 includes a housing 500 that houses a plurality of battery cells and battery pack electronics 34. The housing 500 includes a top wall 504 and bottom wall 508 opposite the top wall 504. An intermediate wall 512 is positioned between the top wall 504 and the bottom wall 508. A groove 516 is positioned between the top wall 504 and the intermediate wall 512 on both a first side 520 and a second, opposite side 524 of the housing 500. Portions of top wall 504 on each side therefore define a rail 526*a*, 526*b*. Additionally, a recess 528 is positioned in the top wall 504. A surface of the recess (not shown) has openings (not shown) that provide access to battery pack terminals (not shown) positioned within the housing 500. Additionally, a pair of latch mechanisms 532 are positioned on opposite sides 520, 524 of the housing 500. Each of the latch mechanisms 532 includes a latch 536 coupled to a latch actuator 540. The latches 536 are positioned within and movable relative to an aperture 544 in the top wall 504 of the housing 500, while the latch actuators 540 are positioned within and movable relative to an aperture 548 of the respective sides 520, 524 of the housing 500. Each of the latches 536 is movable between a locked position and an unlocked position by depressing the latch actuator 540 inwardly against the bias of a spring (not shown).

Figure 23:
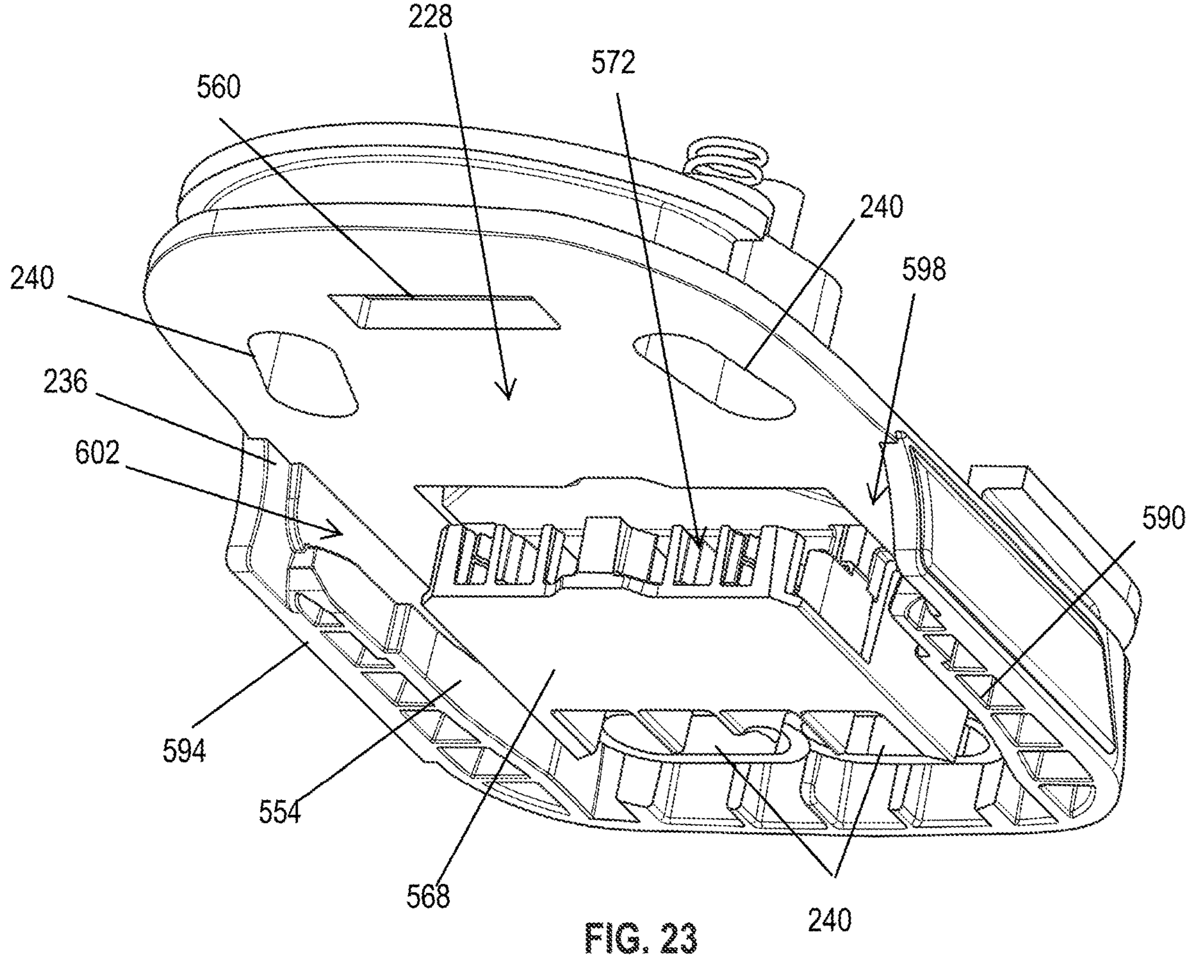
FIG. 23 is a bottom perspective view of the battery pack receptacle of FIG. 22.

As shown in FIGS. 22 and 23, the body 200 of the battery pack receptacle 18*d* includes a first projection 550 positioned adjacent the rear end of the top wall. The first projection 550 includes first leg 550*a* extending from the top surface 204 and a second leg 550*b* extending outwardly from the first leg 550*a*. A first groove 552 is therefore created between the second leg 550*b* and the top surface 204. A support member 554 is positioned adjacent the front end of the top surface 204. The support member 554 has a generally U-shape and defines a second groove 556 between walls 554*a*, 554*b*. In other embodiments, the first and second grooves 552, 556 may be combined such that there is a single groove extending about the entire outer perimeter. A first aperture 560 (FIG. 23) is positioned in the top surface 204 and is positioned adjacent the rear end. A second aperture 564 (FIG. 22) is positioned in the top surface 204 and is positioned adjacent the front end. The second aperture 564 is configured to receive a terminal block 568 that supports the power tool terminals 576 (FIG. 22). The terminal block 568 is coupled to the top surface 204. Like the embodiment of FIGS. 1-12 above, in the embodiment of FIGS. 19-24, the top surface 204 includes the bosses 220, the recesses 240, and the apertures 244, which are configured to receive the springs 270. Additionally, the plates 274 are secured to the body 200 with fasteners 278 in a similar manner as discussed above.

The battery pack receptacle cavity 228 is defined in the body 200 and at least partly defined by the bottom surface 208. As shown, the terminal block 568 extends through the second aperture 564 in the top surface 204 and into the battery pack receptacle cavity 228 and includes openings 572 (FIG. 23), each of which receives and provides access to the power tool terminals 576. The battery pack receptacle cavity 228 of the battery pack receptacle 18 is complementary to the battery pack 22 of FIG. 22. Accordingly, a first projection 590 extends from a first side of the inner surface 236 of the bottom surface 208 and a second projection 594 extends from a second side of the inner surface 236 of the bottom surface 208. The first and second projections 590, 594 extend longitudinally along the body 200. A groove 598, 602 is positioned between the respective first and second projections 590, 594 and a top side of the inner surface 236 of the battery pack receptacle cavity 228.

As with the other embodiments, the battery pack receptacle 18 is movably coupled to the battery pack attachment portion 130 of the housing 14. In particular, the top wall 504 is positioned within the housing cavity 168, and the first and second flange portions 170*a*, 170*b* of the outer wall 150 are received in the corresponding first and second grooves 552, 556. In other embodiments, the battery pack receptacle 18*d* may include a flange and the housing 14 may include a complementary groove. Regardless, the springs 270 are positioned between the inner wall 154 of the housing 14 and the top surface 204 of the battery pack receptacle 18*d*. The springs 270 allow the battery pack receptacle 18*d* to move (e.g., float) relative to the housing 14 (e.g., the battery pack attachment portion 130), as discussed above. Moreover, like the springs of the embodiment of FIGS. 1-11, the springs 270 of embodiment of FIGS. 19-24 are preloaded in a compressed state at all times. And therefore, as discussed above, the battery pack receptacle 18*d* can move in a first direction represented by arrow 350, as discussed above. Moreover, the first and second distances D1, D2, discussed above, may also be present in the embodiment of FIGS. 19-24, thereby allowing the battery pack receptacle 18*d* to move in two orthogonal directions, as discussed above.

The battery pack receptacle 18*d* is configured to receive and retain the battery pack 22. The rails 526*a*, 526*b* are configured to slidably engage corresponding grooves 598, 602 defined in the battery pack 22 along a second insertion direction, which is transverse to the first insertion direction. The top wall 504 is received within the battery pack receptacle cavity 228 such that each of the rails 526*a*, 526*b* is received in one of the corresponding grooves 598, 602 of the battery pack receptacle cavity 228. Additionally, the perimeter of the terminal block 568 positioned within the battery pack receptacle cavity 228 is positioned within the recess of the top wall 504 of the battery pack 22, such that the power tool terminals 576 can engage and electrically connect with the battery pack terminals. Once positioned, the latches 536 are received in the first aperture 560 in the top wall to secure the battery pack 22 to the battery pack receptacle 18*d*.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A power tool comprising:

a housing defining a battery pack attachment portion, the battery pack attachment portion including a first cavity and a flange;

a printed circuit board positioned in the housing;

a motor positioned within the housing and in electrical communication with the printed circuit board;

a battery pack receptacle positioned within the first cavity and movably coupled to the battery pack attachment portion, the battery pack receptacle including a groove in which the flange of the battery pack attachment portion is received and a second cavity configured to receive at least a portion of a battery pack;

a spring positioned between the battery pack attachment portion and the battery pack receptacle and configured to bias the battery pack receptacle relative to the battery pack attachment portion; and power tool terminals supported by the battery pack receptacle and in electrical communication with the printed circuit board, wherein the battery pack receptacle is movable from a first position in which the spring is in a first compressed state and a second position in which the spring is in a second compressed state, the spring being further compressed in the second position of the battery pack receptacle than the first position of the battery pack receptacle, and wherein the battery pack receptacle is biased into the first position by the spring, wherein in the first position of the battery pack receptacle, the flange is spaced apart from a bottom surface of the groove by a greater distance than in the second position.

2. The power tool of claim 1, wherein an inner surface of the second cavity includes a projection extending therefrom and configured to engage a latch mechanism of the battery pack.

3. The power tool of claim 1, wherein each of the power tool terminals includes a detent that is received in an aperture in the battery pack receptacle.

4. The power tool of claim 1, wherein in the second position of the battery pack receptacle, the flange abuts the bottom surface of the groove.

5. The power tool of claim 1, wherein the groove is positioned in an outer perimeter of the battery pack receptacle.

6. The power tool of claim 1, wherein the battery pack receptacle is movable in at least two orthogonal directions relative to the battery pack attachment portion.

7. The power tool of claim 1, wherein the battery pack receptacle includes one of a hollow projection or rails, the hollow projection configured to receive a stem of the battery pack along a first insertion direction, the stem including battery pack terminals, the rails configured to slidably engage corresponding grooves defined in the battery pack along a second insertion direction, and wherein the first insertion direction and the second insertion direction are transverse to each other.

8. The power tool of claim 1, wherein the spring is positioned between an inner surface of the first cavity of the battery pack attachment portion and a top surface of the battery pack receptacle.

9. The power tool of claim 1, further comprising a gasket adhered to a top surface of the groove, which is opposite the bottom surface, and configured to absorb energy when the flange engages the top surface of the groove.

10. A power tool comprising:

a housing having a handle portion and a battery pack attachment portion, the battery pack attachment portion including a first cavity and one of a flange or a groove extending about a portion of a perimeter of the battery pack attachment portion;

a nosepiece assembly coupled to the housing and defining a driving axis;

a printed circuit board positioned in the housing;

a motor positioned within the housing and in electrical communication with the printed circuit board;

a battery pack receptacle positioned within the first cavity and movably coupled to the battery pack attachment portion, the battery pack receptacle including the other of the flange or the groove extending about at least a portion of a perimeter of the battery pack receptacle and a second cavity configured to receive at least a portion of a battery pack;

a spring positioned between the battery pack attachment portion and the battery pack receptacle to bias the battery pack receptacle relative to the battery pack attachment portion, wherein the spring is oriented along an axis that is transverse to the driving axis; and power tool terminals supported by the battery pack receptacle and in electrical communication with the printed circuit board, wherein the battery pack receptacle is movable from a first position in which the spring is in a first compressed state and a second position that is closer to the battery pack attachment portion of the housing, in which the spring is in a second compressed state, wherein the spring is more compressed in the second position than the first position, wherein the flange is movably received within the groove such that the battery pack receptacle is movable relative to the battery pack attachment portion, and wherein the flange is movable in a first direction relative to the groove and in a second direction relative to the groove, the second direction being orthogonal to the first direction.

11. The power tool of claim 10, wherein the battery pack receptacle further includes a projection configured to engage a latch mechanism of the battery pack.

12. The power tool of claim 10, wherein each of the power tool terminals includes a detent that is received in aperture in the battery pack receptacle.

13. The power tool of claim 10, wherein the battery pack receptacle includes one of a hollow projection or rails, the hollow projection configured to receive a stem of the battery pack along a first insertion direction, the stem including battery pack terminals, the rails configured to slidably engage corresponding grooves defined in the battery pack along a second insertion direction, and wherein the first insertion direction and the second insertion direction are transverse to each other.

14. A power tool comprising:

a housing defining a battery pack attachment portion, the battery pack attachment portion including a first cavity and one of a flange or a groove;

a nosepiece assembly coupled to the housing and defining a driving axis, a printed circuit board positioned in the housing;

a motor positioned within the housing and in electrical communication with the printed circuit board;

a battery pack receptacle positioned within the first cavity and movably coupled to the battery pack attachment portion, the battery pack receptacle including the other of the flange or the groove and a second cavity configured to receive at least a portion of a battery pack, the flange being movably received in the groove;

a gasket adhered to a surface of the groove and configured to absorb energy when the flange engages the surface of the groove;

a spring positioned between the battery pack attachment portion and the battery pack receptacle and configured to bias the battery pack receptacle relative to the battery pack attachment portion, wherein the spring is oriented along an axis that is transverse to the driving axis; and power tool terminals supported by the battery pack receptacle and in electrical communication with the printed circuit board.

15. The power tool of claim 14, wherein the battery pack receptacle is movable in at least two orthogonal directions relative to the battery pack attachment portion.

16. The power tool of claim 14, wherein the battery pack receptacle includes one of a hollow projection or rails, the hollow projection configured to receive a stem of the battery pack along a first insertion direction, the stem including battery pack terminals, the rails configured to slidably engage corresponding grooves defined in the battery pack along a second insertion direction, and wherein the first insertion direction and the second insertion direction are transverse to each other.

* * * * *